United States Patent
Liu et al.

(10) Patent No.: US 11,357,000 B2
(45) Date of Patent: Jun. 7, 2022

(54) METHOD AND DEVICE IN COMMUNICATION NODE USED FOR WIRELESS COMMUNICATION

(71) Applicants: Zheng Liu, Shanghai (CN); Xiaobo Zhang, Shanghai (CN)

(72) Inventors: Zheng Liu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 13 days.

(21) Appl. No.: 16/937,613

(22) Filed: Jul. 24, 2020

(65) Prior Publication Data

US 2021/0029685 A1 Jan. 28, 2021

(30) Foreign Application Priority Data

Jul. 26, 2019 (CN) .......................... 201910681093.1
Aug. 1, 2019 (CN) .......................... 201910708245.2

(51) Int. Cl.
*H04W 72/04* (2009.01)
*H04W 52/24* (2009.01)

(52) U.S. Cl.
CPC ....... *H04W 72/044* (2013.01); *H04W 52/242* (2013.01); *H04W 72/048* (2013.01)

(58) Field of Classification Search
CPC ............. H04W 72/044; H04W 52/242; H04W 72/048; H04W 52/283; H04W 52/367
See application file for complete search history.

(56) References Cited

U.S. PATENT DOCUMENTS

2018/0324716 A1* 11/2018 Jeon .................. H04W 74/0833
2018/0324853 A1* 11/2018 Jeon ...................... H04W 52/04
(Continued)

FOREIGN PATENT DOCUMENTS

CN        101631349 A       1/2010

OTHER PUBLICATIONS

CN 1st Office Action received in application No. 201910708245.2 dated Feb. 8, 2022.
(Continued)

*Primary Examiner* — Mazda Sabouri

(57) ABSTRACT

The disclosure provides a method and device in communication node for wireless communications. The communication node receives first information and second information, transmits a first signaling, and transmits a first signal; the first information is used for determining first power, the second information is used for determining a reference pathloss; wherein the first signaling is used for indicating a target distance and time-frequency resources occupied by the first signal; the reference pathloss corresponds to a reference distance, the reference distance being greater than 0; a ratio between the target distance and the reference distance as well as the reference pathloss are used together for determining a target pathloss; the target pathloss is used for determining second power, and a smaller value between the first power and the second power is used for determining transmitting power of the first signal. The present disclosure can effectively support power control for Groupcast.

18 Claims, 18 Drawing Sheets

(56) References Cited

U.S. PATENT DOCUMENTS

2019/0349867 A1* 11/2019 MolavianJazi ..... H04W 52/146
2020/0404593 A1* 12/2020 Yao ..................... H04W 52/245
2021/0136694 A1* 5/2021 Gao ...................... H04W 52/08

OTHER PUBLICATIONS

CN 1st Search Report received in application No. 201910708245.2 dated Jan. 28, 2022.
3GPP tsg ra\wg1 rl1 Huawei R1-1903944 "Sidelink physical layer procedures for NR V2X".
Electronics Quality Research of Logarithmic Distance Path Loss Model Based on RSSI.
3GPP tsg ran\wg1 rl1 "R1-1812985".
3GPPtsg ran\wg1 rl1 "R1-1907143 Ericsson Physical layer procedures for sidelink".

* cited by examiner

| Candidate combination index | Pathloss | Distance |
|---|---|---|
| 0 | PL#1 | Dis#1 |
| 1 | PL#2 | Dis#3 |
| 2 | PL#3 | Dis#2 |
| ... | ... | ... |
| X-1 | PL#2 | Dis#4 |

FIG. 8

METHOD AND DEVICE IN COMMUNICATION NODE USED FOR WIRELESS COMMUNICATION

CROSS REFERENCE TO RELATED APPLICATIONS

This application claims the priority benefit of Chinese Patent Application No. 201910708245.2, filed on Aug. 1, 2019, and the Chinese Patent Application No. 201910681093.1, filed on Jul. 26, 2019. The full disclosure of which is incorporated herein by reference.

BACKGROUND

Technical Field

The present disclosure relates to a transmission method and device in a wireless communication system, and in particular to a transmission scheme and device of feedback information in wireless communication.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 plenary to standardize the NR.

In response to rapidly growing Vehicle-to-Everything (V2X) traffic, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. At 3GPP RAN #80 Plenary, the technical Study Item (SI) of NR V2X was initialized. At 3GPP RAN #83 Plenary, the WI was decided to start for NR V2X.

SUMMARY

Compared with the existing LTE V2X system, NR V2X has a notable feature in supporting Groupcast and Unicast as well as Hybrid Automatic Repeat Request (HARQ) function. In order to avoid introduction of unnecessary interference and reduce energy consumption of User Equipment (UE) simultaneously, NR V2X transmissions are likely to perform transmitting power control.

In view of the problem in the design of transmitting power control in NR V2X, the present disclosure discloses a solution. It should be noted that the embodiments of a UE in the present disclosure and the characteristics of the embodiments may be applied to a base station if no conflict is incurred, and vice versa. The embodiments of the present disclosure and the characteristics of the embodiments may be mutually combined if no conflict is incurred.

The present disclosure provides a method in a first communication node for wireless communications, comprising:

receiving first information and second information, the first information being used for determining first power, the second information being used for determining a reference pathloss;

transmitting a first signaling; and transmitting a first signal;

wherein the first signaling is used for indicating a target distance and time-frequency resources occupied by the first signal; the reference pathloss corresponds to a reference distance, the reference distance being greater than 0; a ratio between the target distance and the reference distance as well as the reference pathloss are used together for determining a target pathloss; the target pathloss is used for determining second power, and a smaller value between the first power and the second power is used for determining transmitting power of the first signal.

In one embodiment, the way that the second power is determined by the target pathloss provides a method for Groupcast transmissions in V2X to determine transmitting power by a Communication Range, which can effectively reduce interference incurred by Groupcast transmissions as well as energy consumption of UE simultaneously.

In one embodiment, a ratio between the target distance and the reference distance together with the reference pathloss are used for determining the target pathloss, avoiding each Groupcast being capable of obtaining an estimated pathloss of a Groupcast transmission when receiving a UE channel measurement report, so as to enable that Groupcast transmissions can make compensation for pathloss when performing power control and maximize the continuous use of the existing power control design, thus improving efficiency of power control and reduce complexity of standard work.

According to one aspect of the present disclosure, the above method is characterized in also comprising:

receiving third information;

wherein the third information is used for determining a target pathloss factor, a unit of the target pathloss and a unit of the reference pathloss are both dB; for a given ratio between the target distance and the reference distance, a difference value between the target pathloss and the reference pathloss is linearly correlated with the target pathloss factor.

In one embodiment, the target pathloss factor is determined by the third information, which enables that the network side can adjust a model between pathloss and transmission distance as well as a fitting degree of real transmission environment according to the change of transmission environment as accurately as possible, thus improving efficiency and effectiveness of power control.

According to one aspect of the present disclosure, the above method is characterized in that the reference pathloss and the reference distance belong to a reference candidate combination, the reference candidate combination being one of X candidate combinations, and the second information is used for determining the reference candidate combination out of the X candidate combinations; any of the X candidate combinations comprises a pathloss and a distance, the X being a positive integer greater than 1.

In one embodiment, considering a strong correlation between pathloss and transmission distance, the reference pathloss and the reference distance are combined for indication to reduce overhead of indication.

According to one aspect of the present disclosure, the above method is characterized in that the second information comprises M sub-information-block(s), the M sub-information-block(s) being used for determining M pathloss(es)

respectively, the M sub-information-block(s) being used for determining M zone identification(s) respectively, the M being a positive integer; any of the M zone identification(s) is used for identifying a geographic zone, and a geographic location of the first communication node is used for determining a target zone identification, the target zone identification being one of the M zone identification(s); the reference pathloss is one of the M pathloss(es), and a sub-information-block among the M sub-information-block(s) used for determining the reference pathloss is also used for determining the target zone identification.

In one embodiment, the M pathloss(es) is(are) correlated with the M zone identification(s) to realize configuration of a zone-specific pathloss model, so that the pathloss can be configured according to geographical environment and transmission environment of different zones, thus improving flexibility and accuracy of pathloss configuration and ensuring accuracy and effectiveness of power control.

According to one aspect of the present disclosure, the above method is characterized in also comprising:

performing a first measurement, the first measurement being used for determining a first measurement quantity;

wherein the first measurement quantity is used for determining a first pathloss, and the first information is used for determining a first parameter, the first pathloss together with the first parameter being used for determining the first power.

According to one aspect of the present disclosure, the above method is characterized in also comprising:

receiving fourth information;

wherein the fourth information is used for determining a second parameter, and the second parameter and the target pathloss are used for determining the second power.

In one embodiment, the above method is characterized in that the first signaling is also used for indicating the target pathloss.

According to one aspect of the present disclosure, the above method is characterized in also comprising:

monitoring a second signal;

wherein the second signal is used for determining whether the first signal is correctly received; a first sequence is used for generating the second signal; at least one of time-frequency resources occupied by the first signaling or time-frequency resources occupied by the first signal is used for determining time-frequency resources occupied by the second signal, or at least one of the time-frequency resources occupied by the first signaling or the time-frequency resources occupied by the first signal is used for determining the first sequence, or at least one of the time-frequency resources occupied by the first signaling or the time-frequency resources occupied by the first signal is used for determining the time-frequency resources occupied by the second signal and the first sequence.

According to one embodiment of the present disclosure, the above method is characterized in that the first signal comprises a first sub-signal and a second sub-signal, and frequency-domain resources occupied by the first sub-signal are different from frequency-domain resources occupied by the second sub-signal; frequency-domain resources occupied by the second sub-signal comprise frequency-domain resources occupied by the first sub-signal, and time-domain resources occupied by the first sub-signal and time-domain resources occupied by the second sub-signal are orthogonal in time domain; a smaller value between the first power and the second power is used for determining transmitting power of the second sub-signal, and transmitting power of the second sub-signal, a bandwidth of frequency-domain resources occupied by the second sub-signal and a bandwidth of frequency-domain resources occupied by the first sub-signal are used together for determining transmitting power of the first sub-signal.

In one embodiment, a first signal is divided into a first sub-signal and a second sub-signal; the way that transmitting power of the second sub-signal, a bandwidth of frequency-domain resources occupied by the second sub-signal and a bandwidth of frequency-domain resources occupied by the first sub-signal are used together for determining transmitting power of the first sub-signal supports a time-frequency division and multiplexing between a control channel and a data channel, and supports power boosting of the control channel simultaneously, thus improving transmission robustness of the control channel, and optimizing performance of the whole system.

The present disclosure provides a method in a second communication node for wireless communications, comprising:

receiving a first signaling;

receiving a first signal; and transmitting a second signal;

wherein the second signal is used for indicating that the first signal is not correctly received, the first signaling is used for determining a target distance and time-frequency resources occupied by the first signal, and the first signaling is also used for determining a target pathloss; a geographic location of the second communication node, the target distance, and the target pathloss are used together for determining transmitting power of the second signal.

In one embodiment, the way that the first signaling indicates the target pathloss as well as the way that a geographic location of the second communication node, the target distance and the target pathloss are used together for determining transmitting power of the second signal provide a solution for power control of PSFCH. Especially when a transmitting end UE of the PSFCH is Out-of-Coverage, a pathloss of the Sidelink can also be obtained accurately, so as to perform a power control on the transmission of the PSFCH, thus effectively improving transmission performance of the PSFCH.

According to one embodiment of the present disclosure, the above method is characterized in that a first sequence is used for generating the second signal; at least one of time-frequency resources occupied by the first signaling or time-frequency resources occupied by the first signal is used for determining time-frequency resources occupied by the second signal, or at least one of time-frequency resources occupied by the first signaling or time-frequency resources occupied by the first signal is used for determining the first sequence, or at least one of time-frequency resources occupied by the first signaling or time-frequency resources occupied by the first signal is used for determining time-frequency resources occupied by the second signal and the first sequence.

The present disclosure provides a method in a third communication node for wireless communications, comprising:

transmitting first information and second information;

wherein the first information is used for indicating first power, and the second information is used for indicating a reference candidate combination out of the X candidate combinations; the reference candidate combination is one of the X candidate combinations, and any of the X candidate combinations comprises a pathloss and a distance, the X being a positive integer greater than 1; the reference candidate combination comprises a reference pathloss and a reference distance, the reference distance being greater than 0; the reference pathloss and the reference distance are used for determining a pathloss of a Sidelink.

According to one aspect of the present disclosure, the above method is characterized in also comprising:

transmitting third information;

wherein the third information is used for determining a target pathloss factor, a target pathloss is a pathloss that a transmission distance of a Sidelink is equal to a target distance, and a unit of the target pathloss and a unit of the reference pathloss are both dB; for a given ratio between the target distance and the reference distance, a difference between the target pathloss and the reference pathloss is linearly related to the target pathloss factor.

According to one aspect of the present disclosure, the above method is characterized in that the second information comprises M sub-information-block(s), the M sub-information-block(s) being used for determining M pathloss(es) respectively, the M sub-information-block(s) being used for determining M zone identification(s) respectively, the M being a positive integer; any of the M zone identification(s) is used for identifying a geographic zone, and a geographic location of a receiver of the second information is used for determining a target zone identification, the target zone identification being one of the M zone identification(s); the reference pathloss is one of the M pathloss(es), and a sub-information-block among the M sub-information-block(s) used for determining the reference pathloss is also used for determining the target zone identification.

According to one aspect of the present disclosure, the above method is characterized in also comprising:

transmitting fourth information;

wherein the fourth information is used for determining a second parameter, and the second parameter and the target path loss are used for determining the second power.

The present disclosure provides a first communication node for wireless communications, comprising:

a first receiver, receiving first information and second information, the first information being used for determining first power, the second information being used for determining a reference pathloss;

a first transmitter, transmitting a first signaling; and a second transmitter, transmitting a first signal;

wherein the first signaling is used for indicating a target distance and time-frequency resources occupied by the first signal; the reference pathloss corresponds to a reference distance, the reference distance being greater than 0; a ratio between the target distance and the reference distance as well as the reference pathloss are used together for determining a target pathloss; the target pathloss is used for determining second power, and a smaller value between the first power and the second power is used for determining transmitting power of the first signal.

According to one aspect of the present disclosure, the above first communication node is characterized in also comprising:

a second receiver, monitoring a second signal;

wherein the second signal is used for determining whether the first signal is correctly received; a first sequence is used for generating the second signal; at least one of time-frequency resources occupied by the first signaling or time-frequency resources occupied by the first signal is used for determining time-frequency resources occupied by the second signal, or at least one of the time-frequency resources occupied by the first signaling or the time-frequency resources occupied by the first signal is used for determining the first sequence, or at least one of the time-frequency resources occupied by the first signaling or the time-frequency resources occupied by the first signal is used for determining the time-frequency resources occupied by the second signal and the first sequence.

The present disclosure provides a second communication node for wireless communications, comprising:

a third receiver, receiving a first signaling;

a fourth receiver, receiving a first signal; and a third transmitter, transmitting a second signal;

wherein the second signal is used for indicating that the first signal is not correctly received, the first signaling is used for determining a target distance and time-frequency resources occupied by the first signal, and the first signaling is also used for determining a target pathloss; a geographic location of the second communication node, the target distance, and the target pathloss are used together for determining transmitting power of the second signal.

The present disclosure provides a third communication node for wireless communications, comprising:

a fourth transmitter, transmitting first information and second information;

wherein the first information is used for determining first power, and the second information is used for indicating a reference candidate combination out of the X candidate combinations; the reference candidate combination is one of the X candidate combinations, and any of the X candidate combinations comprises a pathloss and a distance, the X being a positive integer greater than 1; the reference candidate combination comprises a reference pathloss and a reference distance, the reference distance being greater than 0; the reference pathloss and the reference distance are used for determining a pathloss of a Sidelink.

In one embodiment, the method in the present disclosure is advantageous in the following aspects:

the adoption of the method in the present disclosure provides a method for Groupcast transmissions in V2X for determining transmitting power by a Communication Range, which can effectively reduce interference incurred by Groupcast transmissions and reduce energy consumption of UE simultaneously.

the adoption of the method in the present disclosure avoids that each Groupcast is capable of obtaining an estimated pathloss of a Groupcast transmission when receiving a UE channel measurement report, so as to enable that the Groupcast transmission can make compensation for the pathloss when performing power control and can maximize the continuous use of the existing power control design, thus improving efficiency of power control and reduce complexity of standard work.

the adoption of the method in the present disclosure ensures that the network side can adjust a model between pathloss and transmission distance as well as a fitting degree of real transmission environment according to the change of transmission environment as accurately as possible, thus improving efficiency and effectiveness of power control.

the method in the present disclosure assumes a strong correlation between a pathloss and a transmission distance, and combines the reference pathloss and the reference distance for indication, thus reducing overhead of the indication.

the method in the present disclosure realizes configuration of a zone-specific pathloss model, so as to configure a pathloss according to geographical environment and transmission environment of different zones, thus improving flexibility and accuracy of the pathloss configuration and ensuring accuracy and effectiveness of power control.

the method in the present disclosure supports a flexible time-frequency division and multiplexing between a control channel and a data channel, as well as Power Boosting of the control channel simultaneously, thus improving the transmission robustness of the control channel, and optimizing performance of the whole system.

the method in the present disclosure provides a solution for power control of PSFCH. Especially when a transmitting end UE of the PSFCH is Out-of-Coverage, a pathloss of the Sidelink can also be accurately obtained, so as to perform a power control on the transmission of the PSFCH, thus effectively improving transmission performance of PSFCH.

BRIEF DESCRIPTION OF THE DRAWINGS

Other features, objects and advantages of the present disclosure will become more apparent from the detailed description of non-restrictive embodiments taken in conjunction with the following drawings:

FIG. 8 illustrates a schematic diagram of X candidate combinations according to one embodiment of the present disclosure;

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
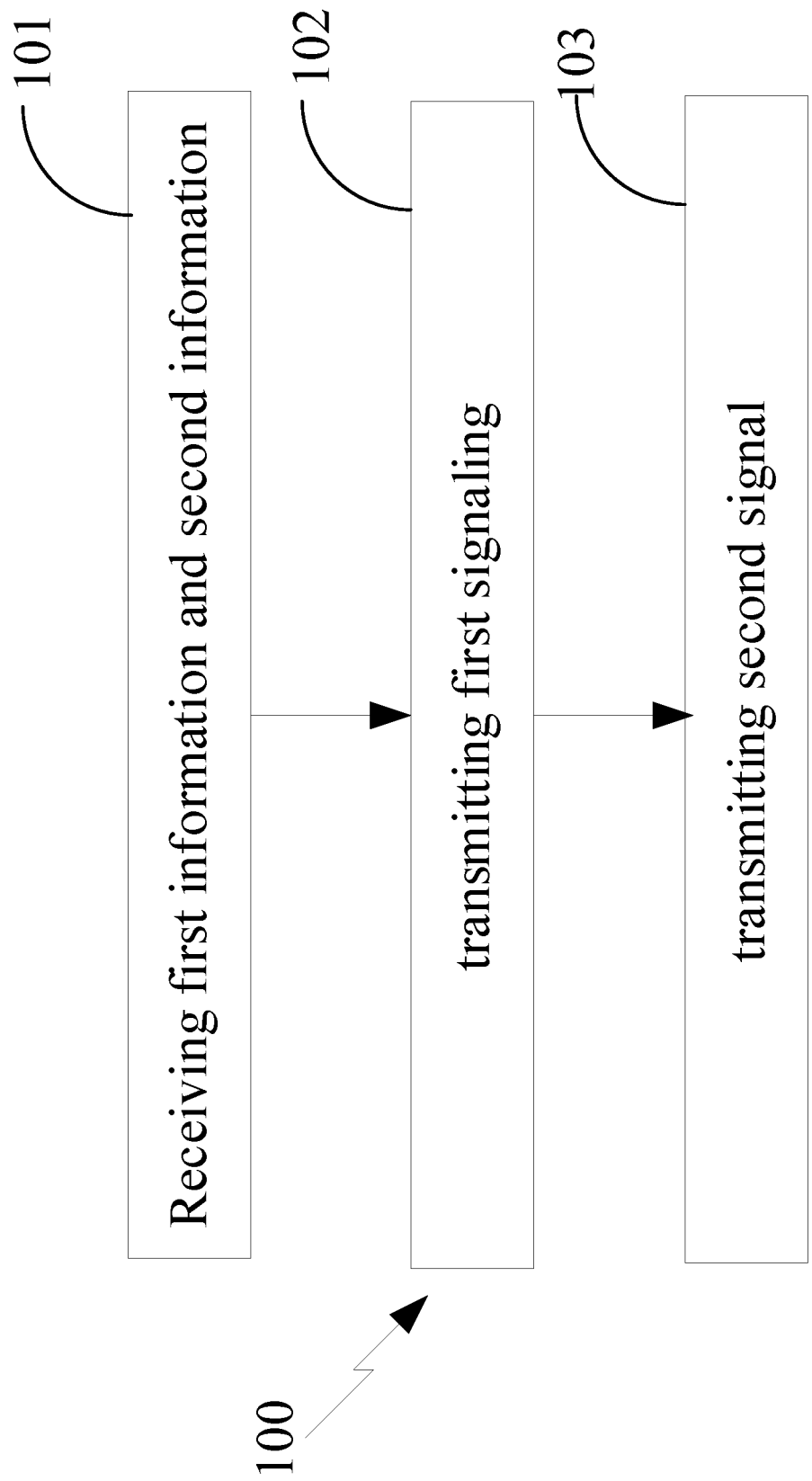
FIG. 1 illustrates a flowchart of first information, second information, a first signaling and a first signal according to one embodiment of the present disclosure.

Embodiment 1 illustrates a flowchart of first information, second information, a first signaling and a first signal according to one embodiment of the present disclosure, as shown in FIG. 1. In FIG. 1, each box represents a step. It should be noted that the order of each box in the diagram does not represent the chronological relationship between the steps presented.

In Embodiment 1, a first communication node in the present disclosure receives first information and second information in step 101, the first information being used for determining first power, the second information being used for determining a reference pathloss; transmits a first signaling in step 102; and transmits a first signal in step 103; wherein the first signaling is used for indicating a target distance and time-frequency resources occupied by the first signal; the reference pathloss corresponds to a reference distance, the reference distance being greater than 0; a ratio between the target distance and the reference distance as well as the reference pathloss are used together for determining a target pathloss; the target pathloss is used for determining second power, and a smaller value between the first power and the second power is used for determining transmitting power of the first signal.

In one embodiment, the first communication node is currently In-Coverage.

In one embodiment, the first communication node is currently Out-of-Coverage.

In one embodiment, the first information is transmitted through an air interface.

In one embodiment, the first information is transmitted through a radio interface.

In one embodiment, the first information is transmitted through a PC5 interface.

In one embodiment, the first information is transmitted through a Uu interface.

In one embodiment, the first information is transmitted through a Sidelink.

In one embodiment, the first information is carried by a baseband signal.

In one embodiment, the first information is carried by a Radio-Frequency signal.

In one embodiment, the first information is transferred inside the first communication node.

In one embodiment, the first information comprises higher-layer information, and the first information is transferred from a higher layer of the first communication node to a physical layer of the first communication node.

In one embodiment, the first information is Pre-configured.

In one embodiment, the first information comprises physical-layer information.

In one embodiment, the first information comprises dynamic information.

In one embodiment, the first information is semi-persistent information.

In one embodiment, the first information comprises all or part of information in a System Information Block (SIB).

In one embodiment, the first information comprises all or part of a Radio Resource Control (RRC) signaling.

In one embodiment, the first information comprises all or part of a Preconfigured Radio Resource Control (RRC) Information Element (IE).

In one embodiment, the first information is Cell Specific/Cell Common.

In one embodiment, the first information is UE Specific/Dedicated.

In one embodiment, the first information is Zone-Specific.

In one embodiment, the first information is Broadcast.

In one embodiment, the first information is Unicast.

In one embodiment, the first information comprises all or part of Fields of Downlink Control Information (DCI).

In one embodiment, the first information is carried through a Downlink Shared Channel (DL-SCH).

In one embodiment, the first information is carried through a Physical Downlink Shared Channel (PDSCH).

In one embodiment, the first information is carried through a Sidelink Shared Channel (SL-SCH).

In one embodiment, the first information is carried through a Physical Sidelink Shared Channel (PSSCH).

In one embodiment, the first information is carried through a Physical Downlink Control Channel (PDCCH).

In one embodiment, the above phrase that the first information is used for determining first power includes the following meaning: the first information is used by the first communication node in the present disclosure for determining the first power.

In one embodiment, the above phrase that the first information is used for determining first power includes the following meaning: the first information is used for directly indicating the first power.

In one embodiment, the above phrase that the first information is used for determining first power includes the following meaning: the first information is used for indirectly indicating the first power.

In one embodiment, the above phrase that the first information is used for determining first power includes the following meaning: the first information is used for explicitly indicating the first power.

In one embodiment, the above phrase that the first information is used for determining first power includes the following meaning: the first information is used for implicitly indicating the first power.

In one embodiment, the above phrase that the first information is used for determining first power includes the following meaning: the first information indicates a third parameter, the third parameter being used for determining the first power.

In one embodiment, the above phrase that the first information is used for determining first power includes the following meaning: the first information indicates a third parameter, the third parameter being used for determining a value range of the first power, and the first communication node determines the first power by itself within the value range of the first power.

In one embodiment, the first information comprises an Information Element (IE) "p-Max".

In one embodiment, the first information comprises a Field "additionalPmax" in an IE "NR-NS-PmaxList".

In one embodiment, the first information comprises all or part of an IE "maxTxpower".

In one embodiment, the above phrase that the first information is used for determining first power includes the following meaning: the first information indicates M maximum transmitting power for M Chanel Busy Ratio (CBR) interval(s), the M being a positive integer, and the first power is equal to one of the M maximum transmitting power.

In one embodiment, the above phrase that the first information is used for determining first power includes the following meaning: the first information indicates M maximum transmitting power for M Chanel Busy Ratio (CBR) range(s), M being a positive integer; a CBR for the first communication node when transmitting the first signal belongs to a first CBR range, the first CBR range being one of the M CBR range(s), and the first power is equal to one of the M maximum transmitting power corresponding to the first CBR range.

In one embodiment, the above phrase that the first information is used for determining first power includes the following meaning: the first information indicates a third parameter, the third parameter being a CBR when the first communication node transmits the first signal, and the third parameter being used for determining the first power.

In one embodiment, the second information is transmitted through an air interface.

In one embodiment, the second information is transmitted through a radio interface.

In one embodiment, the second information is transmitted through a PC5 interface.

In one embodiment, the second information is transmitted through a Uu interface.

In one embodiment, the second information is transmitted through a Sidelink.

In one embodiment, the second information is carried by a baseband signal.

In one embodiment, the second information is carried by a Radio-Frequency signal.

In one embodiment, the second information is transferred inside the first communication node.

In one embodiment, the second information comprises higher-layer information, and the second information is transferred from a higher layer of the first communication node to a physical layer of the first communication node.

In one embodiment, the second information is Pre-configured.

In one embodiment, the second information comprises physical-layer information.

In one embodiment, the second information comprises dynamic information.

In one embodiment, the second information is semi-persistent information.

In one embodiment, the second information comprises all or part of information in a System Information Block (SIB).

In one embodiment, the second information comprises all or part of a Radio Resource Control (RRC) signaling.

In one embodiment, the second information comprises all or part of a pre-configured Radio Resource Control (RRC) Information Element (IE).

In one embodiment, the second information is Cell Specific/Cell Common.

In one embodiment, the second information is UE Specific/Dedicated.

In one embodiment, the second information is Zone-Specific.

In one embodiment, the second information is Broadcast.

In one embodiment, the second information is Unicast.

In one embodiment, the second information comprises all or part of Fields of Downlink Control Information (DCI).

In one embodiment, the second information is carried through a Downlink Shared Channel (DL-SCH).

In one embodiment, the second information is carried through a Physical Downlink Shared Channel (PDSCH).

In one embodiment, the second information is carried through a Sidelink Shared Channel (SL-SCH).

In one embodiment, the second information is carried through a Physical Sidelink Shared Channel (PSSCH).

In one embodiment, the second information is carried through a Physical Downlink Control Channel (PDCCH).

In one embodiment, the above phrase that the second information is used for determining a reference pathloss includes the following meaning: the second information is used by the first communication node in the present disclosure for determining the reference pathloss.

In one embodiment, the above phrase that the second information is used for determining a reference pathloss includes the following meaning: the second information is used for directly indicating the reference pathloss.

In one embodiment, the above phrase that the second information is used for determining a reference pathloss includes the following meaning: the second information is used for indirectly indicating the reference pathloss.

In one embodiment, the above phrase that the second information is used for determining a reference pathloss includes the following meaning: the second information is used for explicitly indicating the reference pathloss.

In one embodiment, the above phrase that the second information is used for determining a reference pathloss includes the following meaning: the second information is used for implicitly indicating the reference pathloss.

In one embodiment, the first power is equal to a higher limit of the second power.

In one embodiment, the first power is the configured maximum output power.

In one embodiment, the first power is the configured maximum output power $P_{CMAX, f, c}$.

In one embodiment, the first power is a Power Class of the first communication node.

In one embodiment, the first power is transmitting power when the first communication node transmits an uplink signal.

In one embodiment, the first power is a higher limit of transmitting power when the first communication node transmits a Sidelink signal.

In one embodiment, the first power is a higher limit of transmitting power when the first communication node transmits a Sidelink signal.

In one embodiment, the first power is transmitting power calculated by an uplink pathloss adopted by the first communication node when assuming to transmit a Sidelink signal.

In one embodiment, the first power is $P_{MAX\_CBR}$.

In one embodiment, the first power is maximum output power relevant with a Channel Busy Ratio (CBR).

In one embodiment, the first power is measured by dBm.

In one embodiment, the first power is measured by W.

In one embodiment, the first power is measured by mW.

In one embodiment, the first power is equal to a small value compared among the configured maximum output power of the first communication node in the present disclosure, maximum output power relevant with a Channel Busy Ratio (CBR), and transmitting power calculated by an uplink pathloss adopted by the first communication node when assuming to transmit a Sidelink signal.

In one embodiment, the first power is equal to a smaller value between the configured maximum output power of the first communication node in the present disclosure and transmitting power calculated by an uplink pathloss adopted by the first communication node when assuming to transmit a Sidelink signal.

In one embodiment, the reference pathloss is measured by dB.

In one embodiment, the reference pathloss is a pathloss calculated according to a given pathloss model.

In one embodiment, the reference pathloss is a pathloss calculated according to given geographic environment.

In one embodiment, the reference pathloss is a virtual pathloss.

In one embodiment, the reference pathloss is a real pathloss.

In one embodiment, the first signaling is transmitted through an air interface.

In one embodiment, the first signaling is transmitted through a radio interface.

In one embodiment, the first signaling is transmitted through a PC5 interface.

In one embodiment, the first signaling is transmitted through a Uu interface.

In one embodiment, the first signaling is transmitted through a Sidelink.

In one embodiment, the first signaling is carried by a baseband signal.

In one embodiment, the first signaling is carried by a Radio-Frequency signal.

In one embodiment, the first signaling is a physical-layer signaling.

In one embodiment, the first signaling is a higher-layer signaling.

In one embodiment, the first signaling is Broadcast.

In one embodiment, the first signaling is Unicast.

In one embodiment, the first signaling carries Sidelink Control Information (SCI).

In one embodiment, the first signaling carries part or all of Fields in Sidelink Control Information (SCI).

In one embodiment, the first signaling is transmitted through a Physical Sidelink Control Channel (PSCCH).

In one embodiment, the first signaling is transmitted through a Physical Sidelink Shared Channel (PSSCH).

In one embodiment, the first signaling comprises all or part of IEs in a Radio Resource Control signaling.

In one embodiment, the first signaling comprises all or part of Fields in an Information Element (IE) in a Radio Resource Control (RRC) signaling.

In one embodiment, a target receiver of the first signaling is the second communication node in the present disclosure.

In one embodiment, the above phrase that the first signaling is used for indicating a target distance and time-frequency resources occupied by the first signal comprises the following meaning: the first signaling is used by the first communication node in the present disclosure for indicating the target distance and time-frequency resources occupied by the first signal.

In one embodiment, the above phrase that the first signaling is used for indicating a target distance and time-frequency resources occupied by the first signal comprises the following meaning: the first signaling is used for directly indicating the target distance and time-frequency resources occupied by the first signal.

In one embodiment, the above phrase that the first signaling is used for indicating a target distance and time-frequency resources occupied by the first signal comprises the following meaning: the first signaling is used for indirectly indicating the target distance and time-frequency resources occupied by the first signal.

In one embodiment, the above phrase that the first signaling is used for indicating a target distance and time-frequency resources occupied by the first signal comprises the following meaning: the first signaling is used for explicitly indicating the target distance and time-frequency resources occupied by the first signal.

In one embodiment, the above phrase that the first signaling is used for indicating a target distance and time-frequency resources occupied by the first signal comprises the following meaning: the first signaling is used for implicitly indicating the target distance and time-frequency resources occupied by the first signal.

In one embodiment, the above phrase that the first signaling is used for indicating a target distance and time-frequency resources occupied by the first signal comprises the following meaning: two different Fields in the first signaling are respectively used for indicating the target distance and time-frequency resources occupied by the first signal.

In one embodiment, the above phrase that the first signaling is used for indicating a target distance and time-frequency resources occupied by the first signal comprises the following meaning: a same Field in the first signaling is used for indicating the target distance and time-frequency resources occupied by the first signal.

In one embodiment, the first signaling is also used for indicating a Modulation Coding Scheme adopted by the first signal.

In one embodiment, the first signal is a baseband signal.

In one embodiment, the first signal is a radio-frequency signal.

In one embodiment, the first signal is transmitted through an air interface.

In one embodiment, the first signal is transmitted through a radio interface.

In one embodiment, the first signal is transmitted through a PC5 interface.

In one embodiment, the first signal is transmitted through a Uu interface.

In one embodiment, the first signal is transmitted through a Sidelink.

In one embodiment, the first signal is transmitted through a Sidelink Shared Channel (SL-SCH).

In one embodiment, the first signal is transmitted through a Physical Sidelink Shared Channel (PSSCH).

In one embodiment, the first signal is transmitted through a Physical Uplink Shared Channel (PUSCH).

In one embodiment, all or part of a Transport Block is used for generating the first signal.

In one embodiment, the target distance is illustrated by a geographic distance.

In one embodiment, the target distance is a geodetic distance.

In one embodiment, the target distance is a geographic distance of 2 Dimension (2D).

In one embodiment, the target distance is a geographic distance of 3 Dimension (3D).

In one embodiment, the target distance is measured by meter (m).

In one embodiment, the target distance is illustrated by a transmission delay of a radio signal.

In one embodiment, the reference distance is illustrated by a geographic distance.

In one embodiment, the reference distance is a geodetic distance.

In one embodiment, the reference distance is a geographic distance of 2 Dimension (2D).

In one embodiment, the reference distance is a geographic distance of 3 Dimension (3D).

In one embodiment, the reference distance is measured by meter (m).

In one embodiment, the reference distance is illustrated by a transmission delay of a radio signal.

In one embodiment, the target distance is equal to the reference distance.

In one embodiment, the target distance is not equal to the reference distance.

In one embodiment, the above phrase that the reference pathloss corresponds to a reference distance includes the following meaning: the second information is used for determining the reference pathloss and the reference distance.

In one embodiment, the above phrase that the reference pathloss corresponds to a reference distance includes the following meaning: the reference pathloss is a pathloss for the reference distance.

In one embodiment, the above phrase that the reference pathloss corresponds to a reference distance includes the following meaning: the reference pathloss and the reference distance are carried in a same IE.

In one embodiment, the phrase that the reference pathloss corresponds to a reference distance includes the following meaning: a same IE in the second information is used for determining the reference pathloss and the reference distance.

In one embodiment, the phrase that the reference pathloss corresponds to a reference distance includes the following meaning: a same Field in the second information is used for determining the reference pathloss and the reference distance.

In one embodiment, the phrase that the reference pathloss corresponds to a reference distance includes the following meaning: the reference pathloss is a pathloss gone through by the first communication node when it assumes a transmission distance of a signal is equal to the reference distance.

In one embodiment, the phrase that the reference pathloss corresponds to a reference distance includes the following meaning: the reference pathloss is a pathloss gone through by the first communication node when it assumes a transmission distance of a signal is equal to the reference distance in the current transmission environment.

In one embodiment, the phrase that the reference pathloss corresponds to a reference distance includes the following meaning: the reference pathloss is relevant with the reference distance.

In one embodiment, the phrase that the reference pathloss corresponds to a reference distance includes the following meaning: there exists a case where the reference pathloss changes with the change of the reference distance.

In one embodiment, the target pathloss is measured by dB.

In one embodiment, the target pathloss is a pathloss calculated according to a given pathloss model.

In one embodiment, the target pathloss is a pathloss calculated according to a given geographical environment.

In one embodiment, the target pathloss is a pathloss (PL) of a Sidelink.

In one embodiment, the target pathloss is a pathloss gone through by the first communication node when it assumes a transmission distance of a signal is equal to the target distance in the current transmission environment.

In one embodiment, the target pathloss is a pathloss for the target distance.

In one embodiment, the target pathloss is a pathloss which the first communication node assumes for the target distance.

In one embodiment, the target pathloss is a real pathloss for the target distance.

In one embodiment, the above phrase that a ratio between the target distance and the reference distance as well as the reference pathloss are used together for determining a target pathloss includes the following meaning: a ratio between the target distance and the reference distance as well as the reference pathloss are used together by the first communication node in the present disclosure for determining the target pathloss.

In one embodiment, the phrase that a ratio between the target distance and the reference distance as well as the reference pathloss are used together for determining a target pathloss includes the following meaning: a ratio between the target distance and the reference distance as well as the reference pathloss are used together for determining a target pathloss based on a calculation formula.

In one embodiment, the phrase that a ratio between the target distance and the reference distance as well as the reference pathloss are used together for determining a target pathloss includes the following meaning: a ratio between the target distance and the reference distance as well as the reference pathloss are used for determining the target pathloss based on a mapping rule.

In one embodiment, the phrase that a ratio between the target distance and the reference distance as well as the reference pathloss are used together for determining a target pathloss includes the following meaning: only a ratio between the target distance and the reference distance as well as the reference pathloss are used together for determining the target pathloss.

In one embodiment, the phrase that a ratio between the target distance and the reference distance as well as the reference pathloss are used together for determining a target pathloss includes the following meaning: there exists a ratio between the target distance and the reference distance as well as a parameter other than the reference pathloss are used together for determining the target pathloss.

In one embodiment, the phrase that a ratio between the target distance and the reference distance as well as the reference pathloss are used together for determining a target pathloss is realized by the following formula:

$$PL_{groupcast} = \log_{10}(d_{groupcast}/d_{reference}) PL_{Reference}$$

wherein $PL_{groupcast}$ represents a target pathloss, $d_{groupcast}$ represents a target distance, $d_{reference}$ represents a reference distance, and $PL_{Reference}$ represents a reference pathloss.

In one embodiment, the phrase that a ratio between the target distance and the reference distance as well as the reference pathloss are used together for determining a target pathloss includes the following meaning: a difference value between the target pathloss and the reference pathloss as well as a ratio between the target distance and the reference distance are linearly related.

In one embodiment, the phrase that a ratio between the target distance and the reference distance as well as the reference pathloss are used together for determining a target pathloss includes the following meaning: a difference value between the target pathloss and the reference pathloss as well as a base-10 logarithm of a ratio between the target distance and the reference distance are linearly related.

In one embodiment, the phrase that a ratio between the target distance and the reference distance as well as the reference pathloss are used together for determining a target pathloss includes the following meaning: a difference value between the target pathloss and the reference pathloss as well as a logarithm of a ratio between the target distance and the reference distance is proportional.

In one embodiment, the second power is measured by dBm.

In one embodiment, the second power is measured by W.

In one embodiment, the second power is measured by mW.

In one embodiment, the second power and the first power are measured by a same unit.

In one embodiment, when the second power is not greater than the first power, the second power is equal to transmitting power of the first signal.

In one embodiment, the second power is a possible transmitting power value of a signal calculated by the first communication node in the present disclosure.

In one embodiment, the above phrase that the target pathloss is used for determining second power includes the following meaning: the target pathloss is used by the first communication node in the present disclosure for determining the second power.

In one embodiment, the above phrase that the target pathloss is used for determining second power includes the following meaning: the target pathloss based on the calculation formula is used by the first communication node in the present disclosure for calculating the second power.

In one embodiment, the above phrase that a smaller value between the first power and the second power is used for determining transmitting power of the first signal" includes the following meaning: a smaller value between the first power and the second power is used by the first communication node in the present disclosure for determining transmitting power of the first signal.

In one embodiment, the above phrase that a smaller value between the first power and the second power is used for determining transmitting power of the first signal" includes the following meaning: a smaller value between the first power and the second power is equal to transmitting power of the first signal.

In one embodiment, the above phrase that a smaller value between the first power and the second power is used for determining transmitting power of the first signal" includes the following meaning: a smaller value between the first power and the second power as well as a third value are used together for determining transmitting power of the first signal.

In one embodiment, the above phrase that a smaller value between the first power and the second power is used for determining transmitting power of the first signal" includes the following meaning: a smaller value between the first power and the second power is equal to a first value, a smaller value between the first value and third power is equal to transmitting power of the first signal, and the third power is equal to the configured maximum output power of the first communication node.

In one embodiment, the above phrase that a smaller value between the first power and the second power is used for determining transmitting power of the first signal" includes the following meaning: a smaller value between the first power and the second power is equal to a first value, a smaller value between the first value and third power is equal to transmitting power of the first signal, and the third power is equal to maximum output power relevant with a Channel Busy Ratio (CBR).

In one embodiment, the above phrase that a smaller value between the first power and the second power is used for determining transmitting power of the first signal" includes the following meaning: a smaller value between the first power and the second power is equal to a first value, a smaller value between the first value and third power is equal to transmitting power of the first signal, and the third power is equal to transmitting power calculated by an uplink pathloss adopted by the first communication node when assuming to transmit a Sidelink signal.

In one embodiment, the above phrase that a smaller value between the first power and the second power is used for determining transmitting power of the first signal" includes the following meaning: a small value compared among the first power, the second power, third power and fourth power is equal to transmitting power of the first signal, the third power is equal to the configured maximum output power of the first communication node, and the fourth power is equal to maximum output power relevant with a Channel Busy Ratio (CBR).

In one embodiment, the above phrase that a smaller value between the first power and the second power is used for determining transmitting power of the first signal" includes the following meaning: a smaller value between the first power and the second power is used for determining a Power Spectrum Density (PSD) of transmitting power of the first signal.

In one embodiment, the above phrase that a smaller value between the first power and the second power is used for determining transmitting power of the first signal" includes the following meaning: a smaller value between the first power and the second power is used for determining transmitting power of part of the signals comprised in the first signal.

In one embodiment, the above phrase that a smaller value between the first power and the second power is used for determining transmitting power of the first signal" is realized by the following formula:

$$P_{SL}=\min\{P_{max}, P'_{SL}(PL_{SL})\}$$

wherein $P_{SL}$, represents transmitting power of the first signal, $P_{max}$ represents the first power and $P'_{SL}$ ($PL_{SL}$) represents the second power.

In one embodiment, the above phrase that a smaller value between the first power and the second power is used for determining transmitting power of the first signal" is realized by the following formula:

$$P_{SL}=\min\{P_{max}, P_{max\_CBR}, P'_{SL}(PL_{SL}))\}$$

wherein $P_{SL}$, represents transmitting power of the first signal, $P_{max}$ represents the first power, $P'_{SL}$ ($PL_{SL}$) represents the second power, and $P_{max\_CBR}$ represents a maximum output power relevant with a CBR.

In one embodiment, the above phrase that a smaller value between the first power and the second power is used for determining transmitting power of the first signal" is realized by the following formula:

$$P_{SL}=\min\{P_{max}, P'_{SL}(PL_{SL}), P'_{max}(PL_{UL})\}$$

wherein $P_{SL}$, represents transmitting power of the first signal, $P_{max}$ represents the first power, $P'_{SL}$ ($PL_{SL}$) represents the second power, and $P'$ max ($PL_{UL}$) represents transmitting power calculated by an uplink pathloss adopted by the first communication node when assuming to transmit a Sidelink signal.

In one embodiment, the above phrase that a smaller value between the first power and the second power is used for determining transmitting power of the first signal" is realized by the following formula:

$$P_{SL}=\min\{P_{max}, P_{max\_CBR}, P'_{SL}(PL_{SL}), P'_{max}(PL_{UL})\}$$

wherein $P_{SL}$, represents transmitting power of the first signal, $P_{max}$ represents the first power, $P'_{SL}$ ($PL_{SL}$) represents the second power, $P_{max\_CBR}$ represents maximum output power relevant with a Channel Busy Ratio (CBR), and $P'_{max}$ ($PL_{UL}$) represents transmitting power calculated by an uplink pathloss adopted by the first communication node when assuming to transmit a Sidelink signal.

In one embodiment, a transmitting Power Spectrum Density (PSD) of the first signaling is equal to a transmitting PSD of the first signal.

In one embodiment, a transmitting Power Spectrum Density (PSD) of the first signaling is not equal to a transmitting PSD of the first signal.

In one embodiment, a transmitting Power Spectrum Density (PSD) of the first signaling is 3 dBs greater than a transmitting PSD of the first signal.

Embodiment 2

Figure 2:
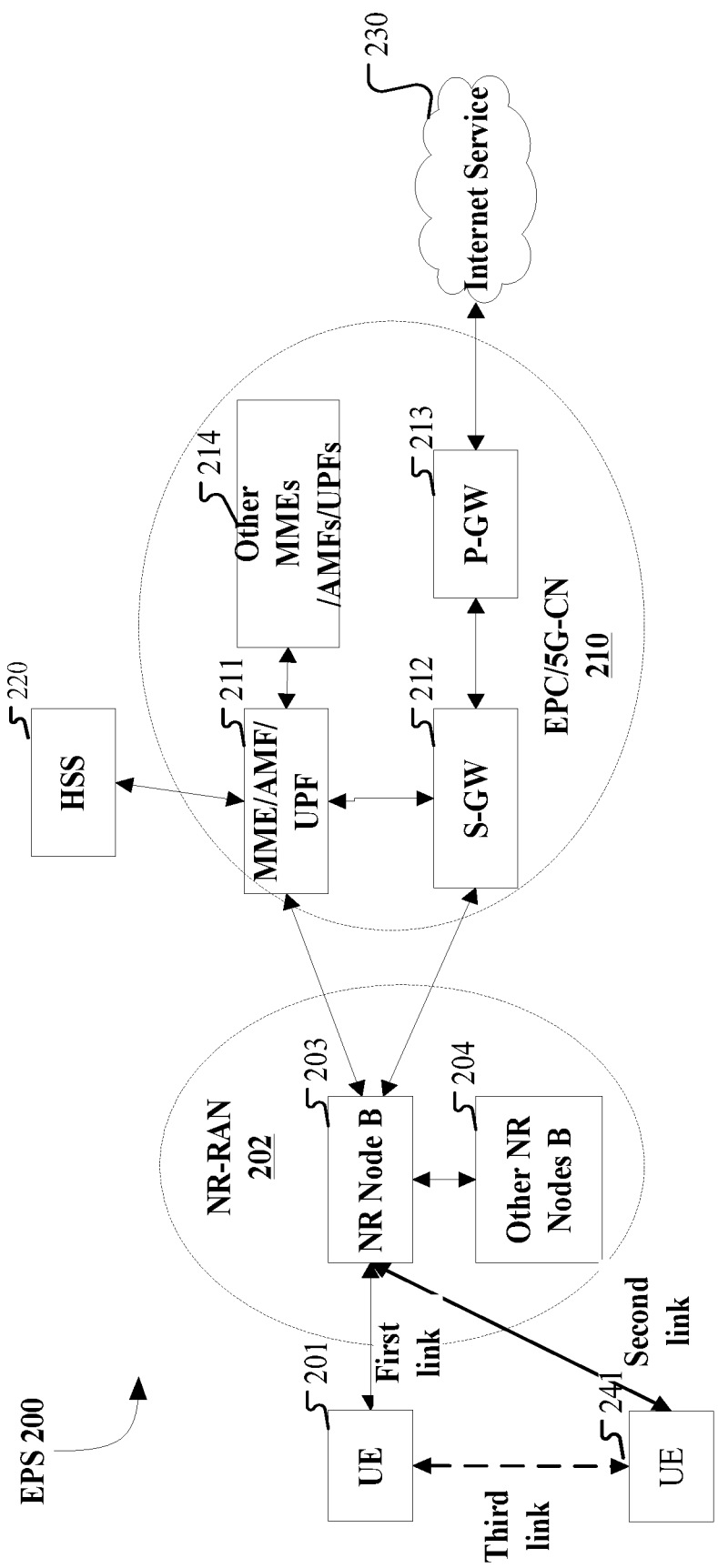
FIG. 2 illustrates a schematic diagram of a network architecture according to one embodiment of the present disclosure.

Embodiment 2 illustrates a schematic diagram of a network architecture according to the present disclosure, as shown in FIG. 2. FIG. 2 is a diagram illustrating a network architecture 200 of 5G NR, Long-Term Evolution (LTE), and Long-Term Evolution Advanced (LTE-A) systems. The 5G NR or LTE network architecture 200 may be called an Evolved Packet System (EPS) 200 The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN comprises an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. In V2X network, the gNB 203 may be a base station, a terrestrial base station relayed via a satellite or a Road Side Unit (RSU) and etc. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, communication units in vehicles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, a car terminal, Internet of Vehicle (IoV) devices or some other appropriate terms. The gNB 203 is connected to the EPC/5G-CN 210 via an SING interface. The EPC/5G-CN 210 comprises a Mobility Management Entity/Authentication Management Field/User Plane Function (MME/AMF/UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first communication node in the present disclosure.

In one embodiment, the UE 201 supports a transmission in a Sidelink.

In one embodiment, the UE 201 supports a PC5 interface.

In one embodiment, the UE 201 supports Internet of Vehicles.

In one embodiment, the UE 201 supports V2X traffic.

In one embodiment, the UE 241 corresponds to the second communication node in the present disclosure.

In one embodiment, the UE 241 supports a transmission in a Sidelink.

In one embodiment, the UE 241 supports a PC5 interface.

In one embodiment, the UE 241 supports Internet of Vehicles.

In one embodiment, the UE 241 supports V2X traffic.

In one embodiment, the gNB 203 corresponds to the third communication node in the present disclosure.

In one embodiment, the gNB 203 supports Internet of Vehicles.

In one embodiment, the gNB 203 supports V2X traffic.

In one embodiment, the third link is a Sidelink.

In one embodiment, the third link is communicated via a PC5 interface.

In one embodiment, the first communication node is In-Coverage.

In one embodiment, the first communication node is Out-of-Coverage.

In one embodiment, the second communication node is In-Coverage.

In one embodiment, the second communication node is Out-of-Coverage.

In one embodiment, the first communication node and the second communication node are In-coverage of a same cell.

In one embodiment, the first communication node and the second communication node are In-coverage of different cells.

Embodiment 3

Figure 3:
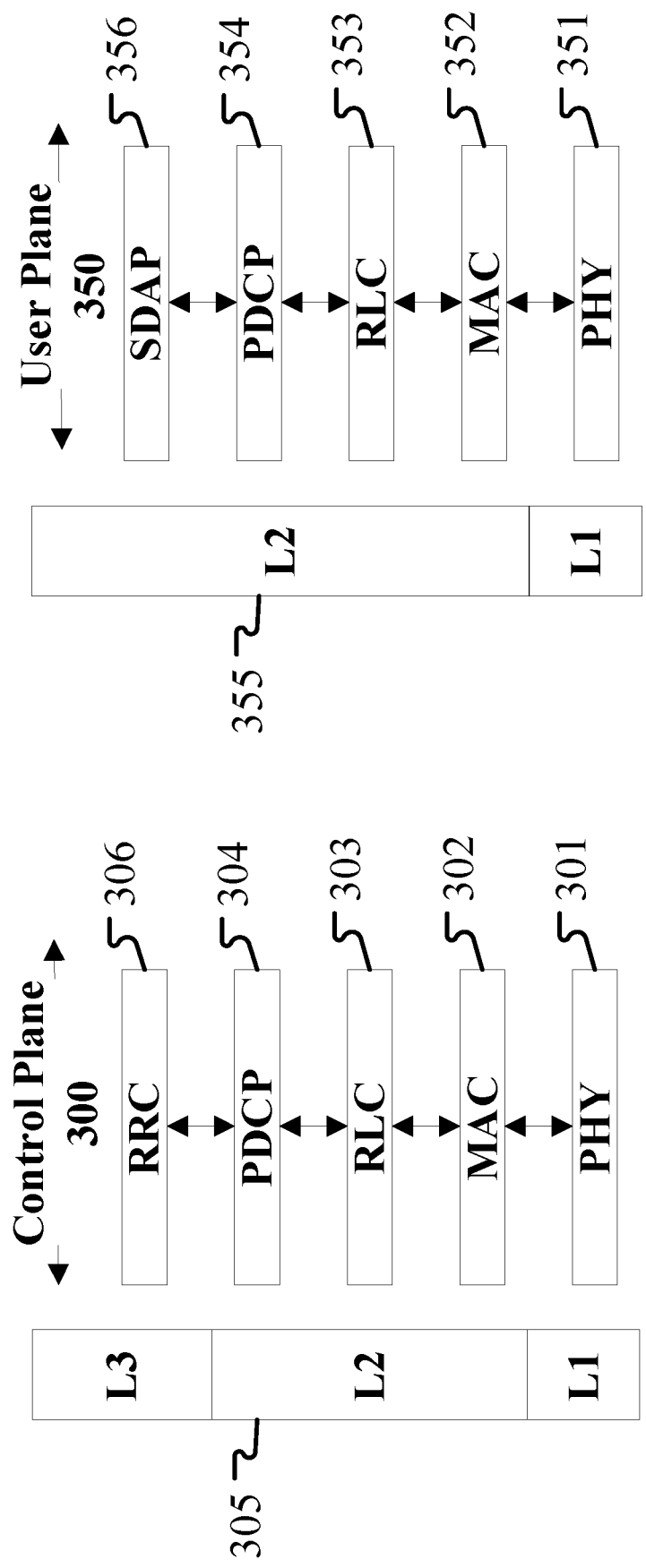
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating a radio protocol architecture of a user plane 350 and a control plane 300. In FIG. 3, the radio protocol architecture for a control plane 300 between a first communication node (vehicle devices or vehicle-mounted communication modules in UE or V2X), or between a first communication node and a third communication node (base station, TRP, eNB or gNB) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of links between a first communication node and a second communication node, as well as between a first communication node and a third communication node via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between third communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between a first communication node and a second communication node various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a third communication node and a first communication node (or a first communication node and a second communication node). The radio protocol architecture of the user plane 350 comprises layer 1 (L1) and layer 2 (L2). In the user plane 350, the radio protocol architecture for the first communication node, the second communication node and the third communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the third communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first communication node in the present disclosure.

In one embodiment, the radio protocol architecture in FIG. 3 is applicable to the second communication node in the present disclosure.

In one embodiment, the radio protocol architecture in FIG. 3 is applicable to the third communication node in the present disclosure.

In one embodiment, the first information in the present disclosure is generated by the RRC 306.

In one embodiment, the first information in the present disclosure is generated by the MAC 302 or the MAC 352.

In one embodiment, the first information in the present disclosure is generated by the PHY 301 or the PHY 351.

In one embodiment, the second information in the present disclosure is generated by the RRC 306.

In one embodiment, the second information in the present disclosure is generated by the MAC 302 or the MAC 352.

In one embodiment, the second information in the present disclosure is generated by the PHY 301 or the PHY 351.

In one embodiment, the first signaling in the present disclosure is generated by the RRC 306.

In one embodiment, the first signaling in the present disclosure is generated by the MAC 302 or the MAC 352.

In one embodiment, the first signaling in the present disclosure is generated by the PHY 301 or the PHY 351.

In one embodiment, the first signal in the present disclosure is generated by the RRC 306.

In one embodiment, the first signal in the present disclosure is generated by the MAC 302 or the MAC 352.

In one embodiment, the first signal in the present disclosure is generated by the PHY 301 or the PHY 351.

In one embodiment, the second signal in the present disclosure is generated by the MAC 302 or the MAC 352.

In one embodiment, the second signal in the present disclosure is generated by the PHY 301 or the PHY 351.

In one embodiment, the third information in the present disclosure is generated by the RRC 306.

In one embodiment, the third information in the present disclosure is generated by the MAC 302 or the MAC 352.

In one embodiment, the third information in the present disclosure is generated by the PHY 301 or the PHY 351.

In one embodiment, the fourth information in the present disclosure is generated by the RRC 306.

In one embodiment, the fourth information in the present disclosure is generated by the MAC 302 or the MAC 352.

In one embodiment, the fourth information in the present disclosure is generated by the PHY 301 or the PHY 351.

In one embodiment, the first measurement quantity in the present disclosure is generated by the RRC 306.

In one embodiment, the first measurement quantity in the present disclosure is generated by the PHY 301 or the PHY 351.

Embodiment 4

Figure 4:
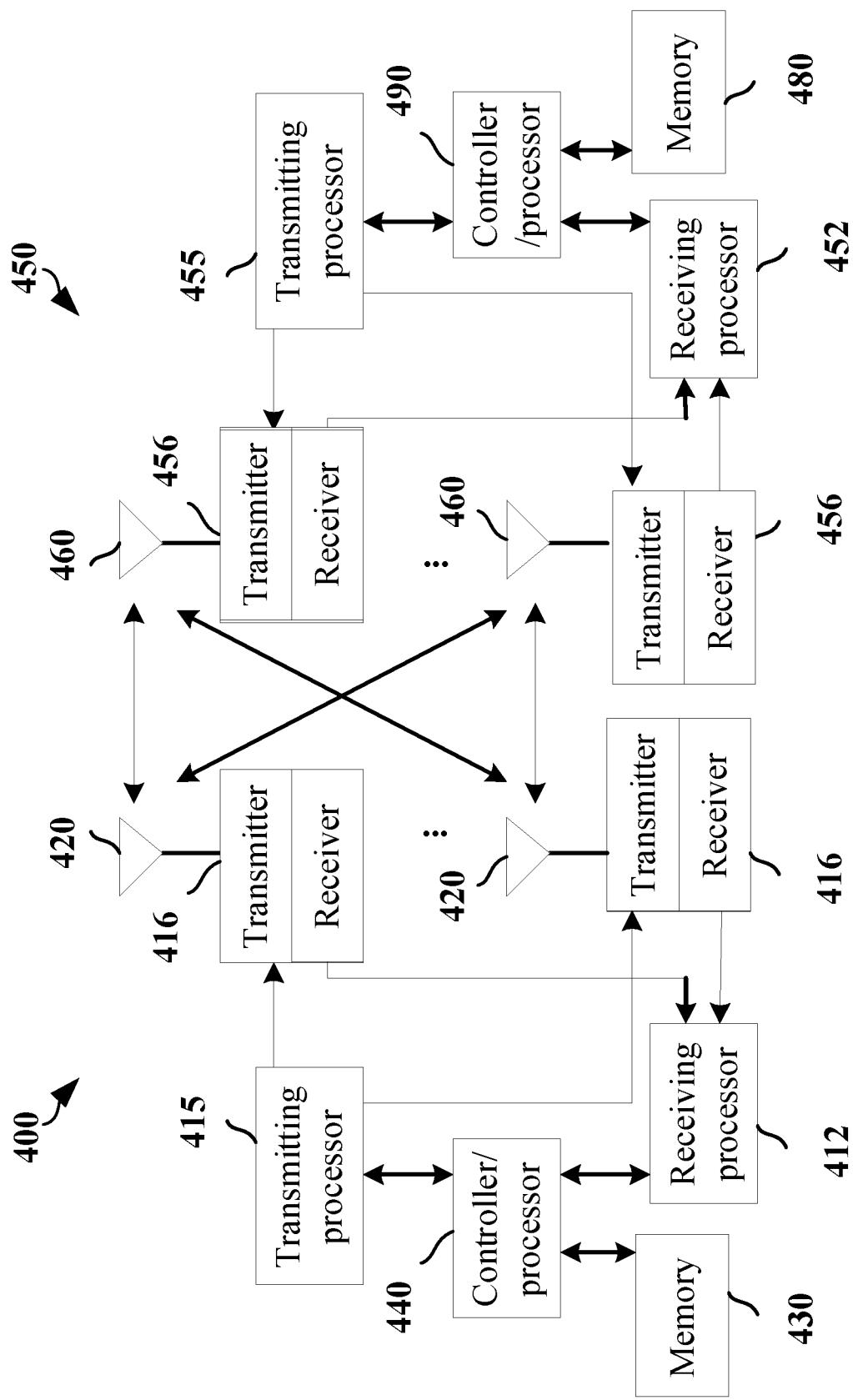
FIG. 4 illustrates a schematic diagram of a first communication node and a second communication node according to one embodiment of the present disclosure.

Embodiment 4 illustrates a schematic diagram of a first communication node and a second communication node in the present disclosure, as shown in FIG. 4.

The first communication node (400) comprises a controller/processor 440, a memory 430, a receiving processor 412, a transmitter/receiver 416, an antenna 420 and a transmitting processor 415. A higher layer packet is provided to the controller/processor 440 by the data source, the controller/processor 440 provides header compression, encryption, packet segmentation and reordering, and a multiplexing between a logical channel and a transport channel so as to implement the L2 layer protocols; the higher layer packet may comprise data or control information, such as a SL-SCH; the transmitting processor 415 performs various signal transmitting processing functions used for the L1 layer (that is, PHY), including coding, interleaving, scrambling, modulation, power control/allocation and generation of physical layer control signaling. The receiving processor 412 performs various signal receiving processing functions used for the L1 layer (that is, PHY), including decoding, de-interleaving, descrambling, demodulation, de-precoding and extraction of physical layer control signaling. The transmitter 416 is used to convert a baseband signal provided by the transmitting processor 415 into a radio-frequency signal and transmit it through the antenna 420, and the receiver 416 is used to convert a radio-frequency signal received through the antenna 420 into a baseband signal and provide it to the receiving processor 412. The composition in the second communication node device (450) is the same as that in the first communication node 400.

In Sidelink transmission, a higher-layer packet (such as a first signal in the present disclosure) is provided to the controller/processor 440, which implements function of L2 layer. In Sidelink transmission, the controller/processor 440 provides header compression, encryption, packet segmentation and reordering, and multiplexing between a logical channel and a transport channel. The controller/processor 440 is also responsible for HARQ operation (if supported), repeat transmission, and a signaling to the UE 450 (including a first signaling in the present disclosure). The transmitting processor 415 implements various signal processing functions on the L1 layer (i.e., physical layer), including coding, interleaving, scrambling, modulation, power control/distribution, precoding, and generation of a physical-layer control signaling, etc. The generation of a first signaling and a physical-layer signal of a first signal in the present disclosure are completed by the transmitting processor 415, and the transmitting processor 415 divides the modulation symbols into parallel streams and maps each stream to a corresponding multi-carrier subcarrier and/or a multi-carrier symbol, which are then transmitted in the form of a radio-frequency signal by the transmitting processor 415 mapping to the antenna 420 via the transmitter 416. At the receiving end, each receiver 456 receives a radio-frequency signal via its corresponding antenna 460, recovers baseband information modulated to a radio-frequency carrier, and supplies baseband information to the receiving processor 452. The receiving processor 452 implements various signal receiving and processing functions of the L1 layer. The signal receiving and processing function includes receiving a first signaling and a first signal in the present disclosure, demodulating based on various modulation schemes (e.g., BPSK, and QPSK) via a multicarrier symbol in a multicarrier symbol stream, then descrambling, decoding and de-interleaving to recover a data or a control signal transmitted by the first communication node 400 on a physical channel, and providing the data and the control signal to the controller/processor 490. The controller/processor 490 implements the function of L2 layer, and interprets the first signal in the present disclosure. The controller/processor can be connected to a memory 480 that stores program code and data. The memory 480 may be called a computer readable medium. In particular, for the monitoring of a second signal in the present disclosure, in the UE 400, each receiver 416 receives a radio-frequency signal of the second signal monitored via the corresponding antenna 420, each receiver 416 recovers baseband information modulated into a radio-frequency carrier, and supplies the baseband information to the receiving processor 412, and the receiving processor 412 determines whether the second signal in the present disclosure is detected or not. When the second signal is transmitted, the second signal is generated in the transmitting processor 455 in the UE 450, then mapped to the antenna 460 via the transmitter 456 to be transmitted in the form of a radio-frequency signal.

In one embodiment, the first communication node (400) comprises: at least one processor and at least one memory. The at least one memory includes computer program codes, and the at least one memory and the computer program codes are configured to be used in collaboration with the at least one processor. The first communication node (400) at least: receives first information and second information, the first information being used for determining a first power, the second information being used for determining a reference pathloss; transmits a first signaling; and transmits a first signal; the first signaling is used for indicating a target distance and time-frequency resources occupied by the first signal; the reference pathloss corresponds to a reference distance, the reference distance being greater than 0; a ratio between the target distance and the reference distance as well as the reference pathloss are used together for determining a target pathloss; the target pathloss is used for determining second power, and a smaller value between the first power and the second power is used for determining transmitting power of the first signal.

In one embodiment, the first communication node (400) comprises: a memory that stores a computer readable instruction program. The computer readable instruction program generates an action when executed by at least one processor. The action includes receiving first information and second information, the first information being used for determining first power, the second information being used for determining a reference pathloss; transmitting a first signaling; and transmitting a first signal; the first signaling is used for indicating a target distance and time-frequency resources occupied by the first signal; the reference pathloss corresponds to a reference distance, the reference distance being greater than 0; a ratio between the target distance and the reference distance as well as the reference pathloss are used together for determining a target pathloss; the target pathloss is used for determining second power, and a smaller value between the first power and the second power is used for determining transmitting power of the first signal.

In one embodiment, the second communication node (450) comprises: at least one processor and at least one memory. The at least one memory includes computer program codes, and the at least one memory and the computer program codes are configured to be used in collaboration with the at least one processor. The second communication node (450) at least: receives a first signaling; receives a first signal; and transmits a second signal; the second signal is used for indicating that the first signal is not correctly received, the first signaling is used for determining a target distance and time-frequency resources occupied by the first signal, and the first signaling is also used for determining the target pathloss; a geographic location of the second communication node, the target distance, and the target pathloss are used together for determining transmitting power of the second signal.

In one embodiment, the second communication node (450) comprises: a memory that stores a computer readable instruction program. The computer readable instruction program generates an action when executed by at least one processor. The action includes receiving a first signaling; receiving a first signal; and transmitting a second signal; the second signal is used for indicating that the first signal is not correctly received, the first signaling is used for determining a target distance and time-frequency resources occupied by the first signal, and the first signaling is also used for determining the target pathloss; a geographic location of the second communication node, the target distance, and the target pathloss are used together for determining transmitting power of the second signal.

In one embodiment, the transmitter 416 (including the antenna 420), the transmitting processor 415 and the controller/processor 440 are used for transmitting the first signaling in the present disclosure.

In one embodiment, the transmitter 416 (including the antenna 420) and the transmitting processor 415 are used for transmitting the first signaling in the present disclosure.

In one embodiment, the transmitter 416 (including the antenna 420), the transmitting processor 415 and the controller/processor 440 are used for transmitting the first signal in the present disclosure.

In one embodiment, the receiver 416 (including the antenna 420) and the receiving processor 412 are used for monitoring the second signal in the present disclosure.

In one embodiment, the receiver 456 (including the antenna 460) and the receiving processor 452 are used for receiving the first signaling in the present disclosure.

In one embodiment, the receiver 456 (including the antenna 460), the receiving processor 452 and the controller/processor 490 are used for receiving the first signal in the present disclosure.

In one embodiment, the transmitter 456 (including the antenna 460), and the transmitting processor 455 are used for transmitting the second signal in the present disclosure.

Embodiment 5

Figure 5:
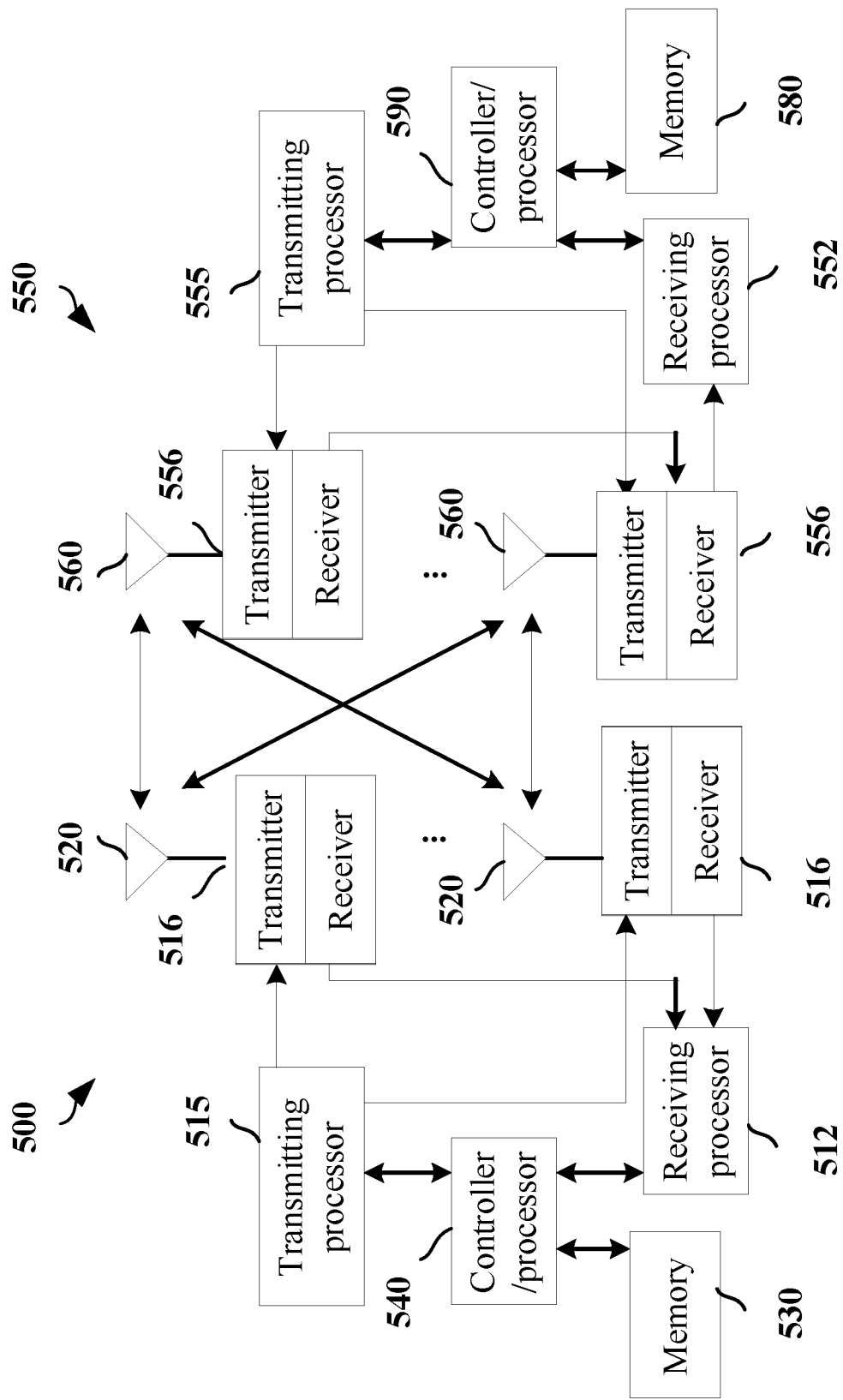
FIG. 5 illustrates a schematic diagram of a first communication node and a third communication node according to one embodiment of the present disclosure.

Embodiment 5 illustrates a schematic diagram of a first communication node and a third communication node in the present disclosure, as shown in FIG. 5.

The first communication node (550) comprises a controller/processor 590, a memory 580, a receiving processor 552, a transmitter/receiver 556, and a transmitting processor 555, the transmitter/receiver 556 comprising an antenna 560. A higher-layer packet is provided to the controller/processor 590 by the data source, the controller/processor 590 provides header compression, encryption, packet segmentation and reordering, and a multiplexing between a logical channel and a transport channel so as to implement the L2 layer protocols used for the user plane and the control plane; the higher layer packet may comprise data or control information, such as DL-SCH, UL-SCH or SL-SCH. The transmitting processor 555 performs various signal transmitting processing functions used for the L1 layer (that is, PHY), including coding, interleaving, scrambling, modulation, power control/allocation and generation of physical layer control signaling. The receiving processor 552 performs various signal receiving processing functions used for the L1 layer (that is, PHY), including decoding, de-interleaving, descrambling, demodulation, de-precoding and extraction of physical layer control signaling. The transmitter 556 is used to convert a baseband signal provided by the transmitting processor 555 into a radio-frequency signal and transmit it via the antenna 560, and the receiver 556 is used to convert a radio-frequency signal received via the antenna 560 into a baseband signal and provide it to the receiving processor 552.

The third communication node (500) may comprise a controller/processor 540, a receiving processor 512, a transmitter/receiver 516 and a transmitting processor 515, the transmitter/receiver 516 comprising an antenna 520. A higher-layer packet is provided to the controller/processor 540, the controller/processor 540 provides header compression and decompression, encryption and decoding, packet segmentation and reordering, as well as a multiplexing between a logical channel and a transport channel so as to implement the L2 layer protocols used for the user plane and the control plane. The higher-layer packet may comprise data or control information, such as DL-SCH or UL-SCH. The transmitting processor 515 performs various signal transmitting processing functions used for the L1 layer (that is, PHY), including coding, interleaving, scrambling, modulation, power control/allocation, precoding and generation of physical layer signalings (including a synchronization signal, a reference signal and etc.). The receiving processor 512 performs various signal receiving and processing functions used for the L1 layer (that is, PHY), including decoding, de-interleaving, descrambling, demodulation, de-precoding and extraction of a physical layer signaling. The transmitter 516 is used to convert a baseband signal provided by the transmitting processor 515 into a radio-frequency signal and transmit it via the antenna 520, and the receiver 516 is used to convert the radio-frequency signal received via the antenna 520 into a baseband signal and provide it to the receiving processor 512.

In downlink (DL), a higher-layer packet (such as high-layer information comprised in first information, second information, third information and fourth information in the present disclosure) is provided to the controller/processor 540. The controller/processor 540 implements functions of L2 layer. In DL, the controller/processor 540 provides header compression, encryption, packet segmentation and reordering, multiplexing between a logical channel and a transport channel, and radio resource allocation for the first communication node 550 and the second communication node in the present disclosure (if the third communication node is a base station of a serving cell of the second communication node) based on various priorities. The controller/processor 540 is also in charge of HARQ operation, retransmission of a lost packet, and a signaling to the first communication node 550 and the second communication node in the present disclosure (if the third communication node is a base station of a serving cell of the second communication node), for example, first information, second information, third information and fourth information in the present disclosure are all generated at the controller/processor 540. The transmitting processor 515 implements various signal processing functions for L1 layer (i.e. physical layer), including encoding, interleaving, scrambling, modulation, power control/distribution, precoding and the generation of a physical-layer control signaling, etc. The generation of physical-layer signals carrying first information, second information, third information and fourth information in the present disclosure are completed at transmitting processor 515. The transmitting processor 515 divides modulation symbols into parallel streams and maps each stream to the corresponding multi-carrier sub-carriers and/or multi-carrier symbols, which is then mapped by the transmitting processor 515 to the antenna 520 via the transmitter 516 and is transmitted in the form of radio-frequency signals. The signal carrying first information, second information, third information and fourth information in the present disclosure is mapped to target air interface resources by the transmitting processor 515 in a corresponding channel on the physical layer and is transmitted in the form of radio-frequency signal by the transmitter 516 mapped to the antenna 520. At the receiving end, each receiver 556 receives a radio-frequency signal via its corresponding antenna 560, each receiver 556 recovers baseband information modulated to a radio-frequency carrier, and supplies baseband information to the receiving processor 552. The receiving processor 552 implements various signal receiving and processing functions of the L1 layer. The signal receiving and processing functions comprise receiving a physical-layer signal carrying first information, second information, third information and fourth information in the present disclosure, etc., and performing a first measurement in the present disclosure, demodulating via multi-carrier symbols in the multi-carrier streams based on various modulation schemes (for example, BPSK, and QPSK), then descrambling, decoding and de-interleaving to recover the data or control signal transmitted by the third communication node 500 on the physical channel, and then providing the data and control signal to the controller/processor 590. The controller/processor 590 implements the function of L2 layer, and the controller/processor 590 interprets the first information, the second information, the third information and the fourth information in the present disclosure. The controller/processor can be connected to a memory 580 that stores program code and data. The memory 580 may be called a computer readable medium.

In one embodiment, the third communication node (500) comprises: at least one processor and at least one memory, and the at least one memory includes computer program codes; the at least one memory and the computer program codes are configured to be used in collaboration with the at least one processor. The third communication node 500 at least: transmits first information and second information, the first information being used for determining first power, the second information being used for indicating a reference candidate combination out of the X candidate combinations; the reference candidate combination is one of the X candidate combinations, and any of the X candidate combinations comprises a pathloss and a distance, the X being a positive integer greater than 1; the reference candidate combination comprises a reference pathloss and a reference distance, the reference distance being greater than 0; the reference pathloss and the reference distance are used for determining a pathloss of a Sidelink.

In one embodiment, the third communication node (500) comprises: a memory that stores a computer readable instruction program. The computer readable instruction program generates an action when executed by at least one processor. The action includes transmitting first information and second information, the first information being used for determining first power, the second information being used for indicating a reference candidate combination out of the X candidate combinations; the reference candidate combination is one of the X candidate combinations, and any of the X candidate combinations comprises a pathloss and a distance, the X being a positive integer greater than 1; the reference candidate combination comprises a reference pathloss and a reference distance, the reference distance being greater than 0; the reference pathloss and the reference distance are used for determining a pathloss of a Sidelink.

In one embodiment, the receiver 556 (including the antenna 560), the receiving processor 552 and the controller/processor 590 are used for receiving the first information in the present disclosure.

In one embodiment, the receiver 556 (including the antenna 560), the receiving processor 552 and the controller/processor 590 are used for receiving the second information in the present disclosure.

In one embodiment, the receiver 556 (including the antenna 560), the receiving processor 552 and the controller/processor 590 are used for receiving the third information in the present disclosure.

In one embodiment, the receiver 556 (including the antenna 560), the receiving processor 552 and the controller/processor 590 are used for receiving the fourth information in the present disclosure.

In one embodiment, the receiver 556 (including the antenna 560), the receiving processor 552 and the controller/processor 590 are used for performing the first measurement in the present disclosure.

In one embodiment, the receiver 556 (including the antenna 560) and the receiving processor 552 are used for performing the first measurement in the present disclosure.

In one embodiment, the transmitter 516 (including the antenna 520), the transmitting processor 515 and the controller/processor 540 are used for transmitting the first information in the present disclosure.

In one embodiment, the transmitter 516 (including the antenna 520), the transmitting processor 515 and the controller/processor 540 are used for transmitting the second information in the present disclosure.

In one embodiment, the transmitter 516 (including the antenna 520), the transmitting processor 515 and the controller/processor 540 are used for transmitting the third information in the present disclosure.

In one embodiment, the transmitter 516 (including the antenna 520), the transmitting processor 515 and the controller/processor 540 are used for transmitting the fourth information in the present disclosure.

Embodiment 6

Figure 6:
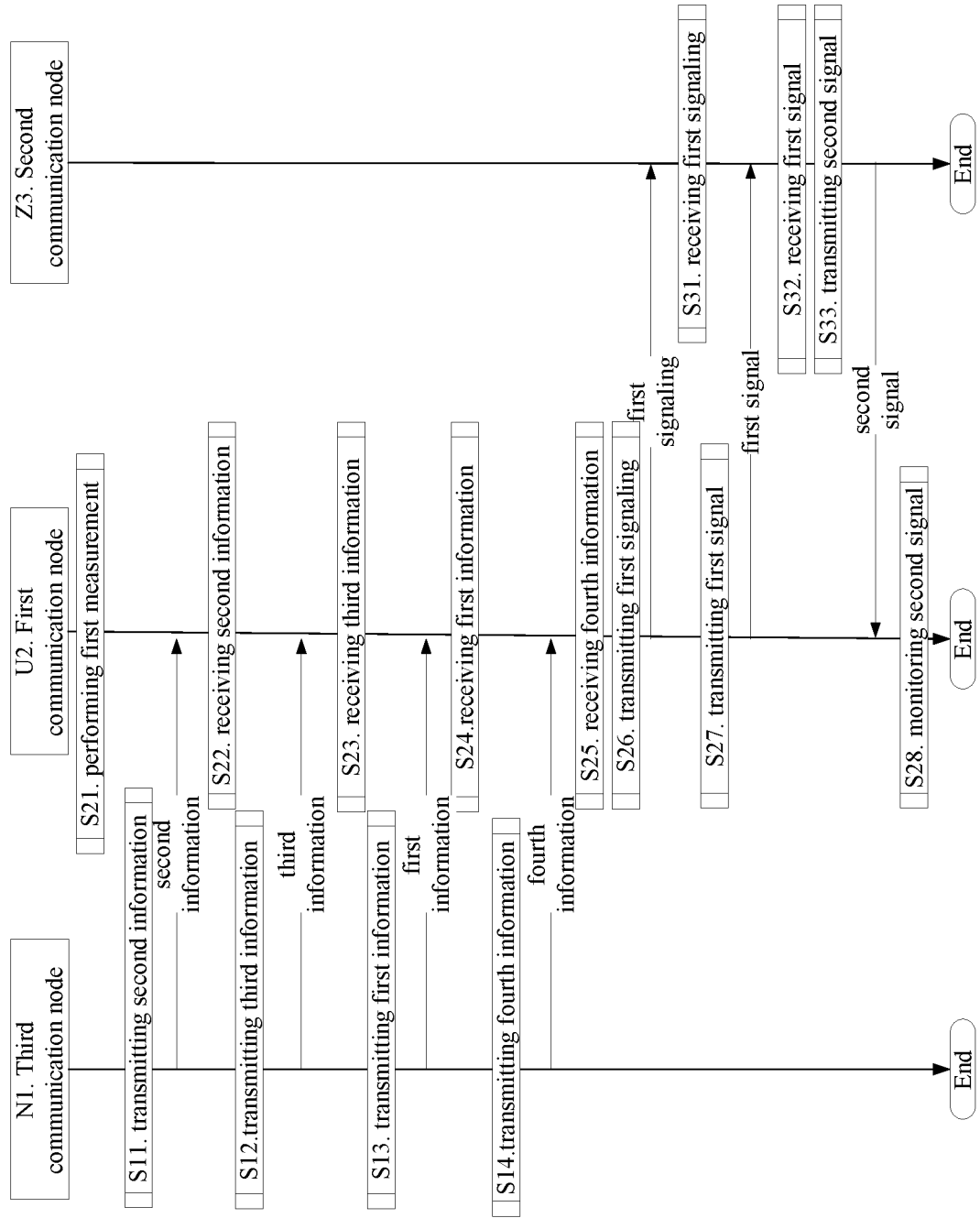
FIG. 6 illustrates a flowchart of a radio signal transmission according to one embodiment of the present disclosure.

Embodiment 6 illustrates a radio signal transmission flowchart according to one embodiment of the present disclosure, as shown in FIG. 6. In FIG. 6, the third communication node N1 is a serving base station of the first communication node U2, and the first communication node U2 and the second communication node Z3 are in communication through a Sidelink.

The third communication node N1 transmits second information in step S11, transmits third information in step S12, transmits first information in step S13, and transmits fourth information in step S14.

The first communication node U2 performs a first measurement in step S21, receives second information in step S22, receives third information in step S23, receives first information in step S24, receives fourth information in step S25, transmits a first signaling in step S26, transmits a first signal in step S27, and monitors a second signal in step S28.

The second communication node Z3 receives a first signaling in step S31, receives a first signal in step S32, and transmits a second signal in step S33.

In Embodiment 6, the first information is used for determining first power, the second information is used for determining a reference pathloss; the first signaling is used for indicating a target distance and time-frequency resources occupied by the first signal; the reference pathloss corresponds to a reference distance, the reference distance being greater than 0; a ratio between the target distance and the reference distance as well as the reference pathloss are used together for determining a target pathloss; the target pathloss is used for determining second power, and a smaller value between the first power and the second power is used for determining transmitting power of the first signal; the third information is used for determining a target pathloss factor, a unit of the target pathloss and a unit of the reference pathloss are both dB; for a given ratio between the target distance and the reference distance, a difference value between the target pathloss and the reference pathloss is linearly related to the target pathloss factor; the first measurement is used for determining a first measurement quantity; wherein the first measurement quantity is used for determining a first pathloss, the first information is used for determining a first parameter, the first pathloss together with the first parameter being used for determining the first power; the fourth information is used for determining a second parameter, and the second parameter and the target pathloss are used for determining the second power; the first signaling is also used for indicating the target pathloss; the second signal is used for determining whether the first signal is correctly received.

In one embodiment, the third information is transmitted through an air interface.

In one embodiment, the third information is transmitted through a radio interface.

In one embodiment, the third information is transmitted through a PC5 interface.

In one embodiment, the third information is transmitted through a Uu interface.

In one embodiment, the third information is transmitted through a Sidelink.

In one embodiment, the third information is carried by a baseband signal.

In one embodiment, the third information is carried by a Radio-Frequency signal.

In one embodiment, the third information is transferred inside the first communication node.

In one embodiment, the third information comprises higher-layer information, and the second information is transferred from a higher layer of the first communication node to a physical layer of the first communication node.

In one embodiment, the third information is pre-configured.

In one embodiment, the third information comprises physical-layer information.

In one embodiment, the third information comprises dynamic information.

In one embodiment, the third information is semi-persistent information.

In one embodiment, the third information comprises all or part of information in a System Information Block (SIB).

In one embodiment, the third information comprises all or part of a Radio Resource Control (RRC) signaling.

In one embodiment, the third information comprises all or part of a pre-configured RRC IE.

In one embodiment, the third information is Cell Specific/Cell Common.

In one embodiment, the third information is UE Specific/Dedicated.

In one embodiment, the third information is Zone-Specific.

In one embodiment, the third information is Broadcast.

In one embodiment, the third information is Unicast.

In one embodiment, the third information comprises all or part of Fields of Downlink Control Information (DCI).

In one embodiment, the third information is carried through a Downlink Shared Channel (DL-SCH).

In one embodiment, the third information is carried through a Physical Downlink Shared Channel (PDSCH).

In one embodiment, the third information is carried through a Sidelink Shared Channel (SL-SCH).

In one embodiment, the third information is carried through a Physical Sidelink Shared Channel (PSSCH).

In one embodiment, the third information is carried through a Physical Downlink Control Channel (PDCCH).

In one embodiment, the third information and the second information are carried by a same signaling.

In one embodiment, the third information and the second information are carried by a same RRC signaling.

In one embodiment, the third information and the second information are carried by two different signalings.

In one embodiment, the third information and the second information are carried by a same IE in a same signaling.

In one embodiment, the third information and the second information are carried by two different IEs in a same signaling.

In one embodiment, the third information and the second information are carried by a same Field in a same signaling.

In one embodiment, the third information and the second information are carried by two different fields in a same signaling.

In one embodiment, the above phrase that the third information is used for determining a target pathloss factor includes the following meaning: the third information is used by the first communication node in the present disclosure for determining the target pathloss factor.

In one embodiment, the above phrase that the third information is used for determining a target pathloss factor includes the following meaning: the third information is used for directly indicating the target pathloss factor.

In one embodiment, the above phrase that the third information is used for determining a target pathloss factor includes the following meaning: the third information is used for indirectly indicating the target pathloss factor.

In one embodiment, the above phrase that the third information is used for determining a target pathloss factor includes the following meaning: the third information is used for explicitly indicating the target pathloss factor.

In one embodiment, the above phrase that the third information is used for determining a target pathloss factor includes the following meaning: the third information is used for implicitly indicating the target pathloss factor.

In one embodiment, the above phrase that the third information is used for determining a target pathloss factor includes the following meaning: the third information indicates the target pathloss factor out of a positive integer number of candidate pathloss factor(s).

In one embodiment, the fourth information is transmitted through an air interface.

In one embodiment, the fourth information is transmitted through a radio interface.

In one embodiment, the fourth information is transmitted through a PC5 interface.

In one embodiment, the fourth information is transmitted through a Uu interface.

In one embodiment, the fourth information is transmitted through a Sidelink.

In one embodiment, the fourth information is carried by a baseband signal.

In one embodiment, the fourth information is carried by a Radio-Frequency signal.

In one embodiment, the fourth information is transferred inside the first communication node.

In one embodiment, the fourth information comprises higher-layer information, and the fourth information is transferred from a higher layer of the first communication node to a physical layer of the first communication node.

In one embodiment, the fourth information is pre-configured.

In one embodiment, the fourth information comprises physical-layer information.

In one embodiment, the fourth information comprises dynamic information.

In one embodiment, the fourth information is semi-persistent information.

In one embodiment, the fourth information comprises all or part of information in a System Information Block (SIB).

In one embodiment, the fourth information comprises all or part of a RRC signaling.

In one embodiment, the fourth information comprises all or part of a pre-configured RRC IE.

In one embodiment, the fourth information is Cell Specific/Cell Common.

In one embodiment, the fourth information is UE Specific/Dedicated.

In one embodiment, the fourth information is Zone-Specific.

In one embodiment, the fourth information is Broadcast.

In one embodiment, the fourth information is Unicast.

In one embodiment, the fourth information comprises all or part of Fields of Downlink Control Information (DCI).

In one embodiment, the fourth information is carried through a Downlink Shared Channel (DL-SCH).

In one embodiment, the fourth information is carried through a Physical Downlink Shared Channel (PDSCH).

In one embodiment, the fourth information is carried through a Sidelink Shared Channel (SL-SCH).

In one embodiment, the fourth information is carried through a Physical Sidelink Shared Channel (PSSCH).

In one embodiment, the fourth information is carried through a Physical Downlink Control Channel (PDCCH).

In one embodiment, the fourth information and the first information are carried by a same signaling.

In one embodiment, the fourth information and the first information are carried by a same RRC signaling.

In one embodiment, the fourth information and the first information are carried by two different signalings.

In one embodiment, the fourth information and the first information are carried by a same IE in a same signaling.

In one embodiment, the fourth information and the first information are carried by two different IEs in a same signaling.

In one embodiment, the fourth information and the first information are carried by a same field in a same signaling.

In one embodiment, the fourth information and the first information are carried by two different Fields in a same signaling.

In one embodiment, the fourth information is the first information.

In one embodiment, the fourth information is the same as the first information.

In one embodiment, the fourth information and the first information are two independent information.

In one embodiment, the fourth information is different from the first information.

In one embodiment, the above phrase that the fourth information is used for determining a second parameter includes the following meaning: the fourth information is used by the first communication node in the present disclosure for determining the second parameter.

In one embodiment, the above phrase that the fourth information is used for determining a second parameter includes the following meaning: the fourth information is used for directly indicating the second parameter.

In one embodiment, the above phrase that the fourth information is used for determining a second parameter includes the following meaning: the fourth information is used for indirectly indicating the second parameter.

In one embodiment, the above phrase that the fourth information is used for determining a second parameter includes the following meaning: the fourth information is used for explicitly indicating the second parameter.

In one embodiment, the above phrase that the fourth information is used for determining a second parameter includes the following meaning: the fourth information is used for implicitly indicating the second parameter.

Embodiment 7

Figure 7:
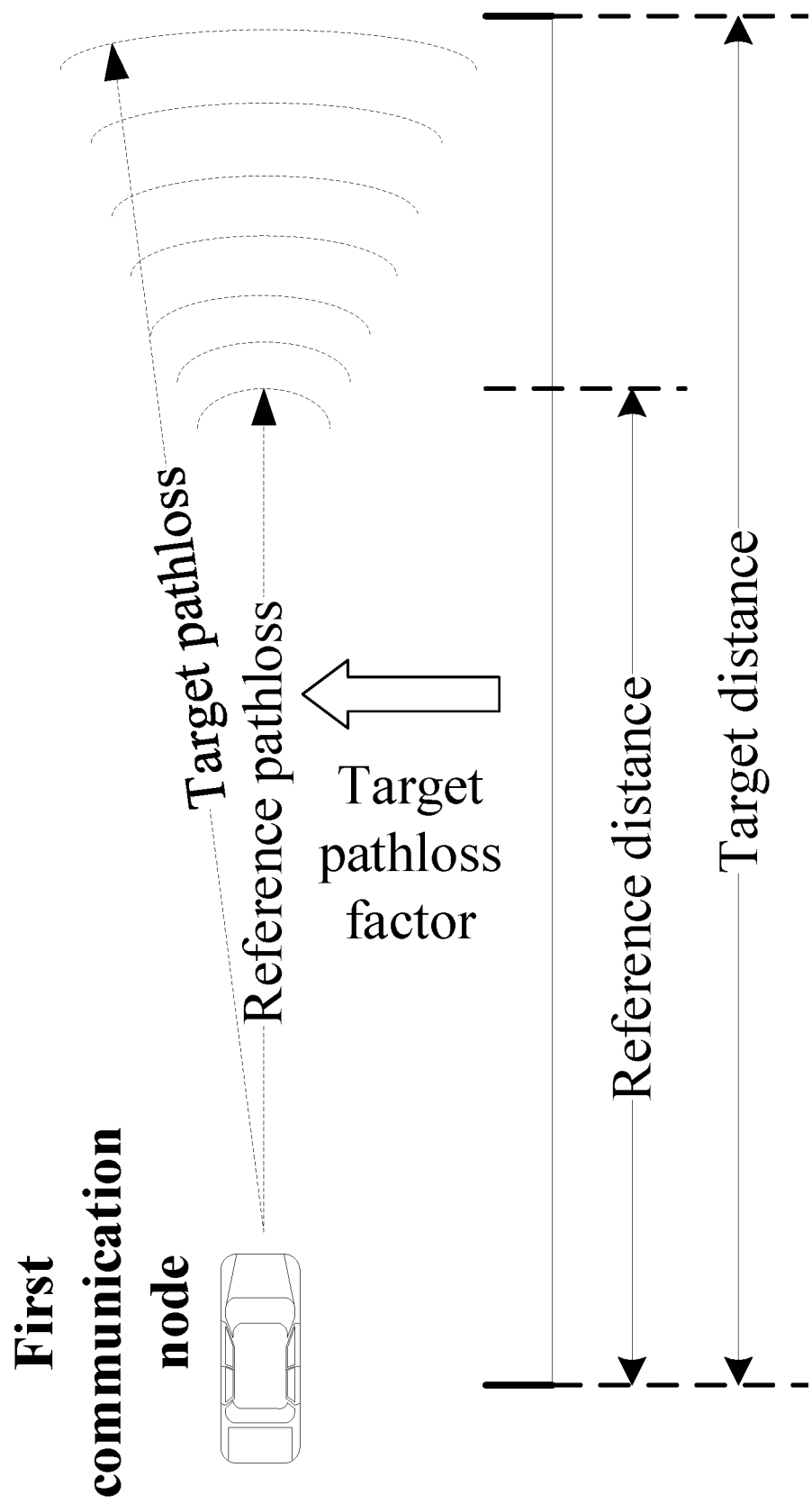
FIG. 7 illustrates a schematic diagram of a relationship between a target pathloss and a reference pathloss according to one embodiment of the present disclosure.

Embodiment 7 illustrates a schematic diagram of a relationship between a target pathloss and a reference pathloss according to one embodiment of the present disclosure, as shown in FIG. 7. In FIG. 7, the horizontal straight line represents the geodesic distance.

In Embodiment 7, a reference pathloss corresponds to a reference distance, the reference distance being greater than 0; a ratio between the target distance and the reference distance in the present disclosure as well with the reference pathloss are used together for determining a target pathloss; a unit of the target pathloss and a unit of the reference pathloss are both dB; for a given ratio between the target distance and the reference distance, a difference value between the target pathloss and the reference pathloss is linearly related to a target pathloss factor.

In one embodiment, the target pathloss factor is related to the transmission environment in which the first communication node is currently located.

In one embodiment, the target pathloss factor is related to the geographical environment in which the first communication node is currently located.

In one embodiment, the target pathloss factor is related to the geographical location in which the first communication node is currently located.

In one embodiment, the target pathloss factor is a real number.

In one embodiment, the target pathloss factor is a rational number.

In one embodiment, the above phrase that for a given ratio between the target distance and the reference distance, a difference value between the target pathloss and the reference pathloss is linearly related to the target pathloss factor includes the following meaning:

$$PL_{groupcast} - PL_{Reference} = \delta \cdot \log_{10}(d_{groupcast}/d_{reference})$$

wherein $PL_{groupcast}$ represents a target pathloss, $d_{groupcast}$ represents a target distance, $d_{reference}$ represents a reference distance, $PL_{Reference}$ represents a reference pathloss, and $\delta$ represents the target pathloss factor.

In one embodiment, the above phrase that for a given ratio between the target distance and the reference distance, a difference value between the target pathloss and the reference pathloss is linearly related to the target pathloss factor includes the following meaning: for a given ratio between the target distance and the reference distance, a difference value between the target pathloss and the reference pathloss is positively linear with the target pathloss factor.

In one embodiment, the above phrase that for a given ratio between the target distance and the reference distance, a difference value between the target pathloss and the reference pathloss is linearly related to the target pathloss factor includes the following meaning: for a given ratio between the target distance and the reference distance, a difference value between the target pathloss and the reference pathloss is negatively linear with the target pathloss factor.

In one embodiment, the above phrase that for a given ratio between the target distance and the reference distance, a difference value between the target pathloss and the reference pathloss is linearly related to the target pathloss factor includes the following meaning: a ratio between the target distance and the reference distance is equal to a first ratio, and a difference value between the target pathloss and the reference pathloss is equal to a product of a logarithm of the target pathloss factor to the first ratio.

In one embodiment, the above phrase that for a given ratio between the target distance and the reference distance, a difference value between the target pathloss and the reference pathloss is linearly related to the target pathloss factor includes the following meaning: a ratio between the target distance and the reference distance is equal to a first ratio, and a difference value between the target pathloss and the reference pathloss is equal to a product of a base-10 logarithm of the target pathloss factor to the first ratio.

In one embodiment, for the given target pathloss factor, a difference value between the target pathloss and the reference pathloss and a base-10 logarithm of a ratio between the target distance and the reference distance are linearly related.

In one embodiment, for the given target pathloss factor, a difference value between the target pathloss and the reference pathloss and a base-10 logarithm of a ratio between the target distance and the reference distance is linearly related.

Embodiment 8

Embodiment 8 illustrates a schematic diagram of X candidate combinations according to one embodiment of the present disclosure, as shown in FIG. 8. In FIG. 8, the first left column represents indexes of X candidate combinations, and the second left column represents a pathloss comprised in each of X candidate combinations, herein, PL #1, PL #2, . . . respectively represent first, second, . . . pathloss value, the third left column represents a geodesic distance comprised in each of X candidate combinations, among which Dis #1, Dis #2, . . . respectively represent first, second, . . . geodesic distance.

In one embodiment, the reference pathloss and the reference distance in the present distance belong to a reference candidate combination, the reference candidate combination being one of X candidate combinations, and the second information in the present disclosure is used for determining the reference candidate combination out of the X candidate combinations; any of the X candidate combinations comprises a pathloss and a distance, the X being a positive integer greater than 1.

In one embodiment, the X candidate combinations are pre-defined.

In one embodiment, the X candidate combinations are fixed.

In one embodiment, the X candidate combinations are fixed in the standard.

In one embodiment, the X candidate combinations are hard-coded.

In one embodiment, the X candidate combinations are Configured.

In one embodiment, the reference candidate combination only comprises the reference pathloss and the reference distance.

In one embodiment, the reference candidate combination also comprises a parameter other than the reference pathloss and the reference distance.

In one embodiment, the reference candidate combination also comprises a physical quantity other than the reference pathloss and the reference distance.

In one embodiment, the reference candidate combination also comprises the target pathloss factor.

In one embodiment, the phrase in the present disclosure that the reference pathloss corresponds to a reference distance includes the following meaning: the reference pathloss and the reference distance belong to the reference candidate combination.

In one embodiment, the phrase in the present disclosure that the reference pathloss corresponds to a reference distance includes the following meaning: the reference pathloss and the reference distance belong to a same candidate combination among the X candidate combinations.

In one embodiment, any two of the X candidate combinations are different.

In one embodiment, there exist two different corresponding elements in any two of the X candidate combinations.

In one embodiment, there exist pathlosses comprised in two of the X candidate combinations being equal.

In one embodiment, there exist distances comprised in two of the X candidate combinations being equal.

In one embodiment, the above phrase that the second information is used for determining the reference candidate combination out of the X candidate combinations includes the following meaning: the second information is used by the first communication node in the present disclosure for a determining the reference candidate combination out of the X candidate combinations.

In one embodiment, the above phrase that the second information is used for a determining the reference candidate combination out of the X candidate combinations includes the following meaning: the second information is used for directly indicating the reference candidate combination from the X candidate combinations.

In one embodiment, the above phrase that the second information is used for a determining the reference candidate combination out of the X candidate combinations includes the following meaning: the second information is used for indirectly indicating the reference candidate combination from the X candidate combinations.

In one embodiment, the above phrase that the second information is used for a determining the reference candidate combination out of the X candidate combinations includes the following meaning: the second information is used for explicitly indicating the reference candidate combination from the X candidate combinations.

In one embodiment, the above phrase that the second information is used for a determining the reference candidate combination out of the X candidate combinations includes the following meaning: the second information is used for implicitly indicating the reference candidate combination from the X candidate combinations.

In one embodiment, the above phrase that the second information is used for a determining the reference candidate combination out of the X candidate combinations includes the following meaning: the second information is used for indicating an index of the reference candidate combination from the X candidate combinations.

Embodiment 9

Figure 9:
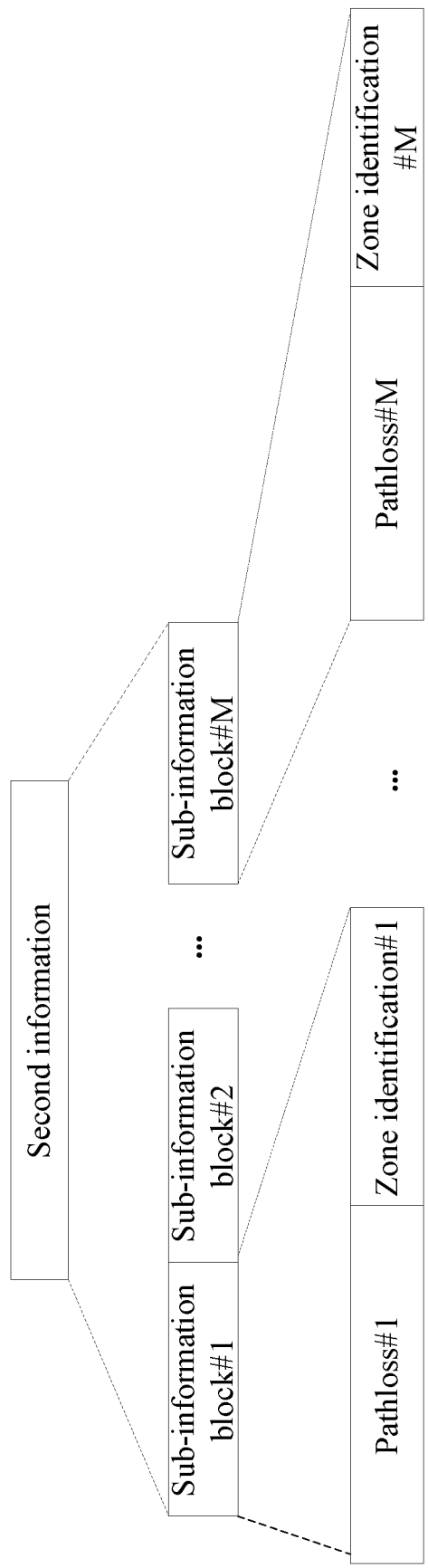
FIG. 9 illustrates a schematic diagram of a relationship between M pathloss(es) and M zone identification(s) according to one embodiment of the present disclosure.

Embodiment 9 illustrates a schematic diagram of a relationship between M pathloss(es) and M zone identification(s) according to one embodiment of the present disclosure, as shown in FIG. 9. In FIG. 9, the top rectangle represents the second information, each rectangle in the middle row represents a sub-information-block among M sub-information-block(s), and each distance in the bottom row represents an IE or a domain in each sub-information-block.

In embodiment 9, the second information in the present disclosure comprises M sub-information-block(s), which is(are) respectively used for determining M pathloss(es), the M sub-information-block(s) being used for determining M zone identifications respectively, the M being a positive integer; any of the M zone identification(s) is used for identifying a geographic zone, and a geographic location of the first communication node in the present disclosure is used for determining a target zone identification, the target zone identification being one of the M zone identification(s); the reference pathloss in the present disclosure is one of the M pathloss(es), and a sub-information-block among the M sub-information-block(s) used for determining the reference pathloss is also used for determining the target zone identification.

In one embodiment, information formats of any two of the M sub-information-blocks are the same, the M being greater than 1.

In one embodiment, the M is equal to 1.

In one embodiment, the M is greater than 1.

In one embodiment, the above phrase that the M sub-information-block(s) is(are) respectively used for determining M pathloss(es) includes the following meaning: the M sub-information-block(s) is(are) used by the first communication node in the present disclosure for determining the M pathloss(es) respectively.

In one embodiment, the above phrase that the M sub-information-block(s) is(are) respectively used for determining M pathloss(es) includes the following meaning: the M sub-information-block(s) is(are) respectively used for directly indicate the M pathloss(es).

In one embodiment, the above phrase that the M sub-information-block(s) is(are) respectively used for determining M pathloss(es) includes the following meaning: the M sub-information-block(s) is(are) respectively used for indirectly indicate the M pathloss(es).

In one embodiment, the above phrase that the M sub-information-block(s) is(are) respectively used for determining M pathloss(es) includes the following meaning: the M sub-information-block(s) is(are) respectively used for explicitly indicate the M pathloss(es).

In one embodiment, the above phrase that the M sub-information-block(s) is(are) respectively used for determining M pathloss(es) includes the following meaning: the M sub-information-block(s) is(are) respectively used for implicitly indicate the M pathloss(es).

In one embodiment, the above phrase that the M sub-information-block(s) is(are) respectively used for determining M pathloss(es) includes the following meaning: the M sub-information-block(s) is(are) used for indicating M candidate combination(s) respectively, any of the M candidate combination(s) is one of the X candidate combinations in the present disclosure, and the M pathloss(es) is(are) pathloss(es) respectively comprised in the M candidate combination(s).

In one embodiment, the above phrase that the M sub-information-block(s) is(are) respectively used for determining M zone identification(s) includes the following meaning: the M sub-information-block(s) is(are) used by the first communication node in the present disclosure for determining the M zone identification(s) respectively.

In one embodiment, the above phrase that the M sub-information-block(s) is(are) respectively used for determining M zone identification(s) includes the following meaning: the M sub-information-block(s) is(are) respectively used for directly indicating the M zone identification(s).

In one embodiment, the above phrase that the M sub-information-block(s) is(are) respectively used for determining M zone identification(s) includes the following meaning: the M sub-information-block(s) is(are) respectively used for indirectly indicating the M zone identification(s).

In one embodiment, the above phrase that the M sub-information-block(s) is(are) respectively used for determining M zone identification(s) includes the following meaning: the M sub-information-block(s) is(are) respectively used for explicitly indicating the M zone identification(s).

In one embodiment, the above phrase that the M sub-information-block(s) is(are) respectively used for determining M zone identification(s) includes the following meaning: the M sub-information-block(s) is(are) respectively used for implicitly indicating the M zone identification(s).

In one embodiment, there exist two of the M pathlosses being equal, the M being greater than 1.

In one embodiment, any two of the M pathlosses being unequal, the M being greater than 1.

In one embodiment, any of the M zone identification(s) is a Zone ID.

In one embodiment, any of the M zone identification(s) is a Zone Index.

In one embodiment, any of the M zone identification(s) is a non-negative integer.

In one embodiment, any of the M zone identification(s) is used for identifying a zone.

In one embodiment, any of the M zone identification(s) is used for identifying more than one zone.

In one embodiment, any two of the M zone identifications are different.

In one embodiment, the zone is a region with continuous longitude and latitude on the earth surface.

In one embodiment, the zone is a region on the earth surface bounded by a longitude interval and a latitude interval.

In one embodiment, the zone comprises a region with scattered longitude on the earth surface.

In one embodiment, the zone comprises a region with scattered latitudes on the earth surface.

In one embodiment, a geographic location of the first communication node is a current geographic location of the first communication node.

In one embodiment, a geographic location of the first communication node is a current geographic location of the first communication node assumed by the first communication node.

In one embodiment, a geographic location of the first communication node is a current geographic location obtained by the first communication node through measurement.

In one embodiment, a geographic location of the first communication node is a current real geographic location of the first communication node.

In one embodiment, a geographic location of the first communication node is a geographic location other than a current real geographic location of the first communication node.

In one embodiment, a geographic location of the first communication node is a current geographic location obtained by the first communication node through positioning.

In one embodiment, a geographic location of the first communication node is a current geographic location obtained by the first communication node through satellite positioning.

In one embodiment, a geographic location of the first communication node is a current geographic location obtained by the first communication node through satellite positioning and measurement.

In one embodiment, the geographic location of the first communication node is the latitude distance and longitude distance of (0,0) coordinate point in the first communication node and the WGS84 model (Military Standard WGS84 Metric MIL-STD-2401 (11 Jan. 1994): "Military Standard Department of Defence World Geodetic System (WGS)").

In one embodiment, the above phrase that a geographic location of the first communication node is used for determining a target zone identification includes the following meaning: a geographic location of the first communication node belongs to a zone identified by the target zone identification.

In one embodiment, the above phrase that a geographic location of the first communication node is used for determining a target zone identification includes the following meaning: the latitude distance and longitude distance of (0,0) coordinate point in the first communication node and the WGS84 model (Military Standard WGS84 Metric MIL-STD-2401 (11 Jan. 1994): "Military Standard Department of Defence World Geodetic System (WGS)") are used for determining the target zone identification.

In one embodiment, the above phrase that a geographic location of the first communication node is used for determining a target zone identification is realized by the following formula:

$$m_1 = \text{Floor}(\text{First\_}x/L_1) \text{Mod } Nx_1;$$

$$n_1 = \text{Floor}(\text{First\_}y/W_1) \text{Mod } Ny_1;$$

$$\text{Zone\_id}_1 = n_1 * Nx_1 + m_1$$

wherein $\text{Zone\_id}_1$ represents an identification of the target zone, $L_1$ represents a surface length of a zone identified by the target zone identification, $W_1$ represents a surface width of a zone identified by the target zone identification, $Nx_1$ and $Ny_1$ are configurable, First_x represents a longitude distance between a current geographic location of the first communication node in the present disclosure and a (0, 0) coordinate point in the WGS84 model, First_y represents a latitude distance between a current geographic location of the first communication node in the present disclosure and a (0, 0) coordinate point in the WGS84 model.

Embodiment 10

Figure 10:
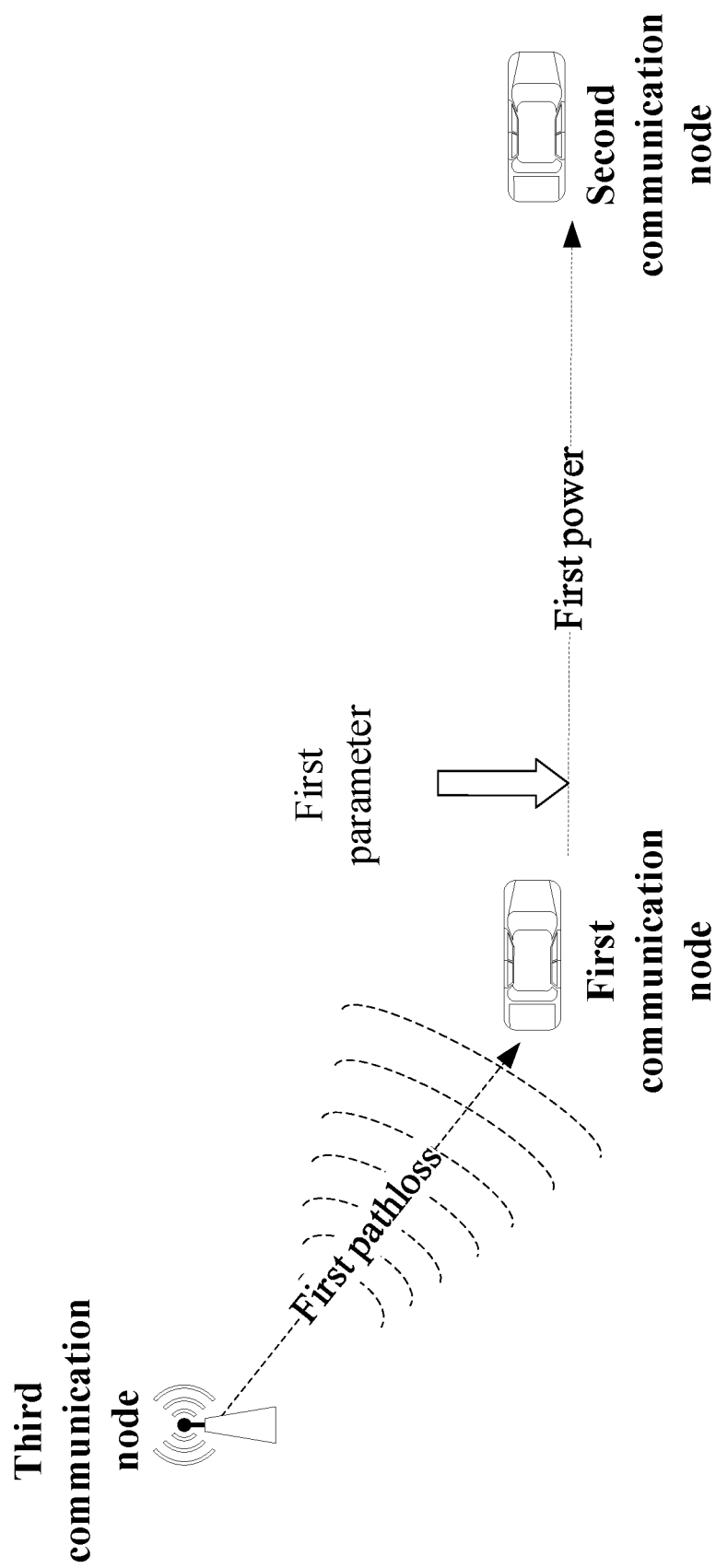
FIG. 10 illustrates a schematic diagram of relationships among a first pathloss, a first parameter, and a first power according to one embodiment of the present disclosure.

Embodiment 10 illustrates a schematic diagram of relationships among a first pathloss, a first parameter, and first power according to one embodiment of the present disclosure, as shown in FIG. 10. In FIG. 10, a first pathloss is a pathloss between a third communication node and a first communication node.

In Embodiment 10, the first measurement quantity in the present disclosure is used for determining a first pathloss, the first information in the present disclosure is used for determining a first parameter, the first pathloss together with the first parameter being used for determining the first power in the present disclosure.

In one embodiment, the first measurement is a measurement for a Reference Signal Received Power (RSRP).

In one embodiment, the first measurement is a measurement for an Evolved-UMTS Terrestrial Radio Access Reference Signal Received Power (E-UTRA RSRP).

In one embodiment, the first measurement is a measurement for a Synchronization Signal Reference Signal Received Power (SS-RSRP).

In one embodiment, the first measurement is a measurement for a Channel Status Information Reference Signal Received Power (CSI-RSRP).

In one embodiment, the first measurement is a measurement for a Reference Signal Received Quality (RSRQ).

In one embodiment, the first measurement is a measurement for an Evolved-UMTS Terrestrial Radio Access Reference Signal Received Quality (E-UTRA RSRQ).

In one embodiment, the first measurement is a measurement for a Synchronization Signal Reference Signal Received Quality (SS-RSRQ).

In one embodiment, the first measurement is a measurement for a Channel Status Information Reference Signal Received Quality (CSI-RSRQ).

In one embodiment, the first measurement is a measurement for receiving a Signal-to-Noise and Interference Ratio (SINR).

In one embodiment, the first measurement is a measurement for receiving an Evolved-UMTS Terrestrial Radio Access Reference Signal Signal-to-Noise and Interference Ratio (E-UTRA RS-SINR).

In one embodiment, the first measurement is a measurement for a Synchronization Signal Signal-to-Noise and Interference Ratio (SS-SINR).

In one embodiment, the first measurement is a measurement for a Channel Status Information Signal-to-Noise and Interference Ratio (CSI-RSRQ).

In one embodiment, the first measurement is a measurement for a downlink signal.

In one embodiment, the first measurement quantity is an RSRP.

In one embodiment, the first measurement quantity is an RSRP.

In one embodiment, the first measurement quantity is an E-UTRA RSRP.

In one embodiment, the first measurement quantity is a CSI-RSRP.

In one embodiment, the first measurement quantity is an RSRQ.

In one embodiment, the first measurement quantity is an E-UTRA RSRQ.

In one embodiment, the first measurement quantity is an SS-RSRQ.

In one embodiment, the first measurement quantity is a CSI-RSRQ.

In one embodiment, the first measurement quantity is an SINR.

In one embodiment, the first measurement quantity is an E-UTRA RS-SINR.

In one embodiment, the first measurement quantity is an SS-SINR.

In one embodiment, the first measurement quantity is a CSI-SINR.

In one embodiment, the first pathloss is a downlink pathloss.

In one embodiment, the first pathloss is a pathloss in a transmission of the Uu interface.

In one embodiment, the first pathloss is an uplink pathloss.

In one embodiment, the above phrase that the first measurement quantity is used for determining a first pathloss includes the following meaning: the first measurement quantity is used for determining the first pathloss after going through a higher-layer filtering.

In one embodiment, the above phrase that the first measurement quantity is used for determining a first pathloss includes the following meaning: the first measurement quantity is used by the first communication node in the present disclosure for determining the first pathloss.

In one embodiment, the above phrase that the first measurement quantity is used for determining a first pathloss includes the following meaning: transmitting power of a reference signal targeted by the first measurement minus the first measurement quantity after going through a higher-layer filtering is equal to the first pathloss.

In one embodiment, the first parameter is a compensation factor of the first pathloss when the first power is calculated.

In one embodiment, the first parameter is target receiving power when the first power is calculated.

In one embodiment, the first parameter is a compensation factor of a Sidelink when the first signal is transmitted.

In one embodiment, the first parameter is target receiving power of a Sidelink when the first signal is transmitted.

In one embodiment, the first parameter is a compensation factor in case of Fractional Pathloss Compensation.

In one embodiment, the first parameter is $\alpha_{b,f,c}(j)$ in power control of Physical Uplink Shared Channel (PUSCH) in TS38.213 (v15.6.0).

In one embodiment, the first parameter is $\alpha$.

In one embodiment, the first parameter is $P_0$.

In one embodiment, the first parameter is $P_{0\_PUSCH,b,f,c}(j)$ in power control of Physical Uplink Shared Channel (PUSCH) in TS38.213 (v15.6.0).

In one embodiment, the first parameter is $\alpha$ when the first signal is transmitted.

In one embodiment, the first parameter is $P_0$ when the first signal is transmitted.

In one embodiment, the first parameter is $\alpha$ of a Sidelink.

In one embodiment, the first parameter is $P_0$ of a Sidelink.

In one embodiment, the above phrase that the first information is used for determining a first parameter includes the following meaning: the first information is used by the first communication node in the present disclosure for determining the first parameter.

In one embodiment, the above phrase that the first information is used for determining a first parameter includes the following meaning: the first information is used for directly indicating the first parameter.

In one embodiment, the above phrase that the first information is used for determining a first parameter includes the following meaning: the first information is used for indirectly indicating the first parameter.

In one embodiment, the above phrase that the first information is used for determining a first parameter includes the following meaning: the first information is used for explicitly indicating the first parameter.

In one embodiment, the above phrase that the first information is used for determining a first parameter includes the following meaning: the first information is used for implicitly indicating the first parameter.

In one embodiment, the above phrase that the first pathloss and the first parameter are used together for determining the first power is realized by the following formula:

$$P'_{max}(PL_{UL}) = P_0(SL) + \alpha \cdot PL_{UL} + 10 \cdot \log_{10}(2^\mu \cdot M_{RB}) + \Delta_{TF}$$

wherein $P'_{max}(PL_{UL})$ represents the first power, $P_0(SL)$ represents the first parameter, $\alpha$ represents a pathloss compensation factor when the first signal is transmitted, $PL_{UL}$ represents the first pathloss, µ represents an index of a Subcarrier Spacing (SCS) occupied by the first signal, $M_{RB}$ represents a number of Physical Resource Blocks (PRB) occupied by the first signal in frequency domain, and $\Delta_{TF}$ represents a compensation amount of transmitting power of the first signal.

In one embodiment, the above phrase that the first pathloss and the first parameter are used together for determining the first power is realized by the following formula:

$$P'_{max}(PL_{UL})=P_0(SL)+\alpha \cdot PL_{UL}+10 \cdot \log_{10}(2^{\mu} \cdot M_{RB})+\Delta_{TF}$$

wherein $P'_{max}$ ($PL_{UL}$) represents the first power, $P_0(SL)$ represents target receiving power of the first signal, a represents the first parameter, $PL_{UL}$ represents the first pathloss, µ represents an index of a Subcarrier Spacing (SCS) occupied by the first signal, $M_{RB}$ represents a number of Physical Resource Blocks (PRB) occupied by the first signal in frequency domain, and $\Delta_{TF}$ represents a compensation amount of transmitting power of the first signal.

In one embodiment, the above phrase that the first pathloss and the first parameter are used together for determining the first power includes the following meaning: the first power is linearly correlated with the first parameter, and for a given pathloss compensation factor, the first power is linearly correlated with the first pathloss.

In one embodiment, the above phrase that the first pathloss and the first parameter are used together for determining the first power includes the following meaning: the first power is linearly related to a product of the first pathloss and the first parameter.

Embodiment 11

Figure 11:
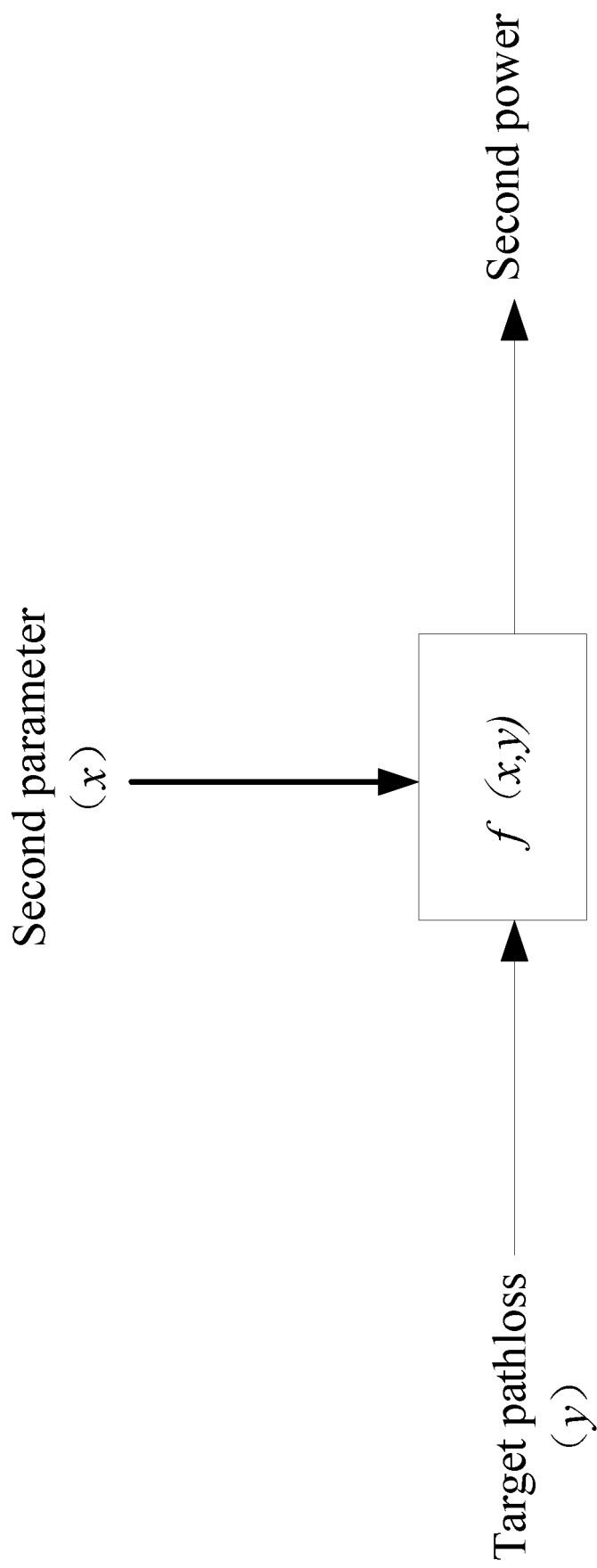
FIG. 11 illustrates a schematic diagram of relationships among a second parameter, a target pathloss and a second power according to one embodiment of the present disclosure.

Embodiment 11 illustrates a schematic diagram of relationships among a second parameter, a target pathloss and second power according to one embodiment of the present disclosure, as shown in FIG. 11. In FIG. 11, a second parameter x and a target pathloss y obtain second power through a function ƒ (x, y).

In Embodiment 11, the fourth information in the present disclosure is used for determining a second parameter, and the second parameter and the target pathloss in the present disclosure are used for determining the second power in the present disclosure.

In one embodiment, the second parameter is the first parameter in the present disclosure, and the fourth information is the same as the first information in the present disclosure.

In one embodiment, the second parameter is different from the first parameter in the present disclosure, and the fourth information is the same as the first information in the present disclosure.

In one embodiment, the second parameter is different from the first parameter in the present disclosure, and the fourth information is different from the first information in the present disclosure.

In one embodiment, the second parameter is a compensation factor of the target pathloss when the second power is calculated.

In one embodiment, the second parameter is target receiving power when the second power is calculated.

In one embodiment, the second parameter is a compensation factor of a Sidelink when the first signal is transmitted.

In one embodiment, the second parameter is target receiving power of a Sidelink when the first signal is transmitted.

In one embodiment, the second parameter is a compensation factor in case of Fractional Pathloss Compensation.

In one embodiment, the second parameter is α.

In one embodiment, the second parameter is $P_0$.

In one embodiment, the second parameter is α when the first signal is transmitted.

In one embodiment, the second parameter is $P_0$ when the first signal is transmitted.

In one embodiment, the second parameter is α of a Sidelink.

In one embodiment, the second parameter is $P_0$ of a Sidelink.

In one embodiment, the phrase that the second parameter and the target pathloss are used for determining the second power is realized by the following formula:

$$P'_{SL}(PL_{SL})=P_0(SL)+\alpha \cdot PL_{SL}+10 \cdot \log_{10}(2^{\mu} \cdot M_{RB})+\Delta_{TF}$$

wherein $P'_{SL}$ ($PL_{SL}$) represents the second power, $P_0$ (SL) represents the second parameter, α represents a pathloss compensation factor when the first signal is transmitted, $PL_{SL}$ represents the target pathloss, µ represents an index of a Subcarrier Spacing (SC S) occupied by the first signal, $M_{RB}$ represents a number of Physical Resource Blocks (PRB) occupied by the first signal in frequency domain, and $\Delta_{TF}$ represents a compensation amount of transmitting power of the first signal.

In one embodiment, the phrase that the second parameter and the target pathloss are used for determining the second power is realized by the following formula:

$$P'_{SL}(PL_{SL})=P_0(SL)+\alpha \cdot PL_{SL}+10 \cdot \log_{10}(2^{\mu} \cdot M_{RB})+\Delta_{TF}$$

wherein $P'_{SL}$ ($PL_{SL}$ represents the second power, $P_0(SL)$ represents target receiving power when the first signal is transmitted, a represents the second parameter, $PL_{SL}$ represents the target pathloss, µ represents an index of a Subcarrier Spacing (SCS) occupied by the first signal, $M_{RB}$ represents a number of PRBs occupied by the first signal in frequency domain, and $\Delta_{TF}$ represents a compensation amount of transmitting power of the first signal.

In one embodiment, the above phrase that the second parameter and the target pathloss is used for determining the second power includes the following meaning: the second power is linearly correlated with the second parameter, and for a given pathloss compensation factor, the second power is linearly correlated with the target pathloss.

In one embodiment, the above phrase that the second parameter and the target pathloss is used for determining the second power includes the following meaning: the second power is linearly correlated with a product of the target pathloss and the second parameter.

Embodiment 12

Figure 12:
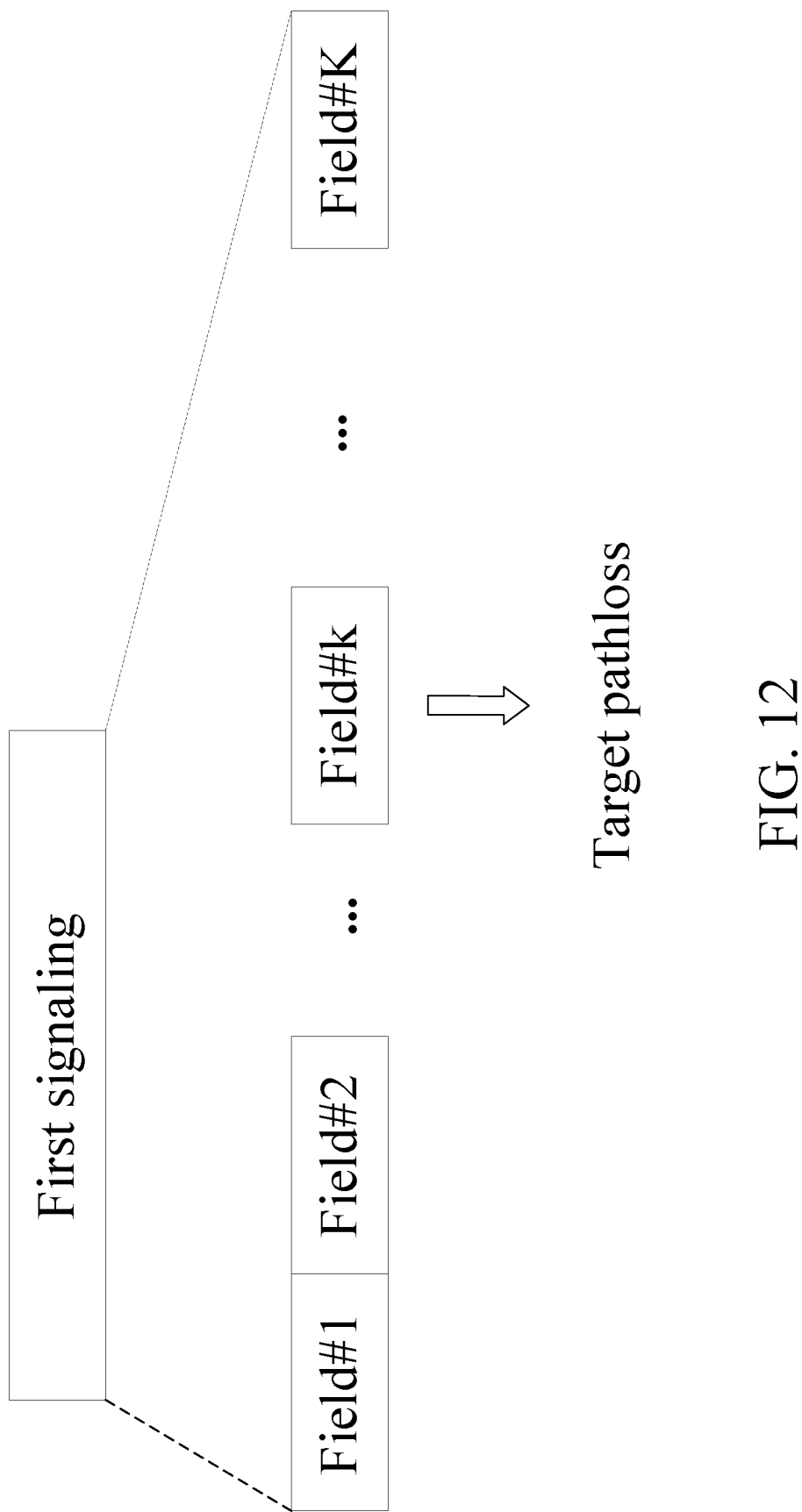
FIG. 12 illustrates a schematic diagram of a first signaling according to one embodiment of the present disclosure.

Embodiment 12 illustrates a schematic diagram of a first signaling according to one embodiment of the present disclosure, as shown in FIG. 12. In FIG. 12, the upper rectangle represents a first signaling, and each of the lower rectangles represents a Field in a first signaling.

In Embodiment 12, the first signaling in the present disclosure is also used for indicating the target pathloss in the present disclosure.

In one embodiment, the target pathloss and the target distance are indicated by a same Field in the first signaling.

In one embodiment, the target pathloss and the target distance are indicated by two different Fields in the first signaling.

In one embodiment, the target pathloss and the target distance belong to one of the X candidate combinations in the present disclosure.

In one embodiment, the target pathloss and the target distance do not belong to any of the X candidate combinations in the present disclosure.

In one embodiment, the target pathloss and the target distance belong to a candidate combination other than the X candidate combinations in the present disclosure.

In one embodiment, the target pathloss and the target distance belong to a candidate combination other than the reference candidate combination among the X candidate combinations in the present disclosure.

In one embodiment, the target pathloss and the target distance are independently indicated.

In one embodiment, the target pathloss and the target distance are jointly indicated.

In one embodiment, the target pathloss and the target distance are indicated after going through a Joint Coding.

In one embodiment, the above phrase that the first signaling is also used for indicating the target pathloss includes the following meaning: the first signaling is also used by the first communication node in the present disclosure for indicating the target pathloss.

In one embodiment, the above phrase that the first signaling is also used for indicating the target pathloss includes the following meaning: the first signaling is also used for directly indicating the target pathloss.

In one embodiment, the above phrase that the first signaling is also used for indicating the target pathloss includes the following meaning: the first signaling is also used for indirectly indicating the target pathloss.

In one embodiment, the above phrase that the first signaling is also used for indicating the target pathloss includes the following meaning: the first signaling is also used for explicitly indicating the target pathloss.

In one embodiment, the above phrase that the first signaling is also used for indicating the target pathloss includes the following meaning: the first signaling is also used for implicitly indicating the target pathloss.

Embodiment 13

Figure 13:
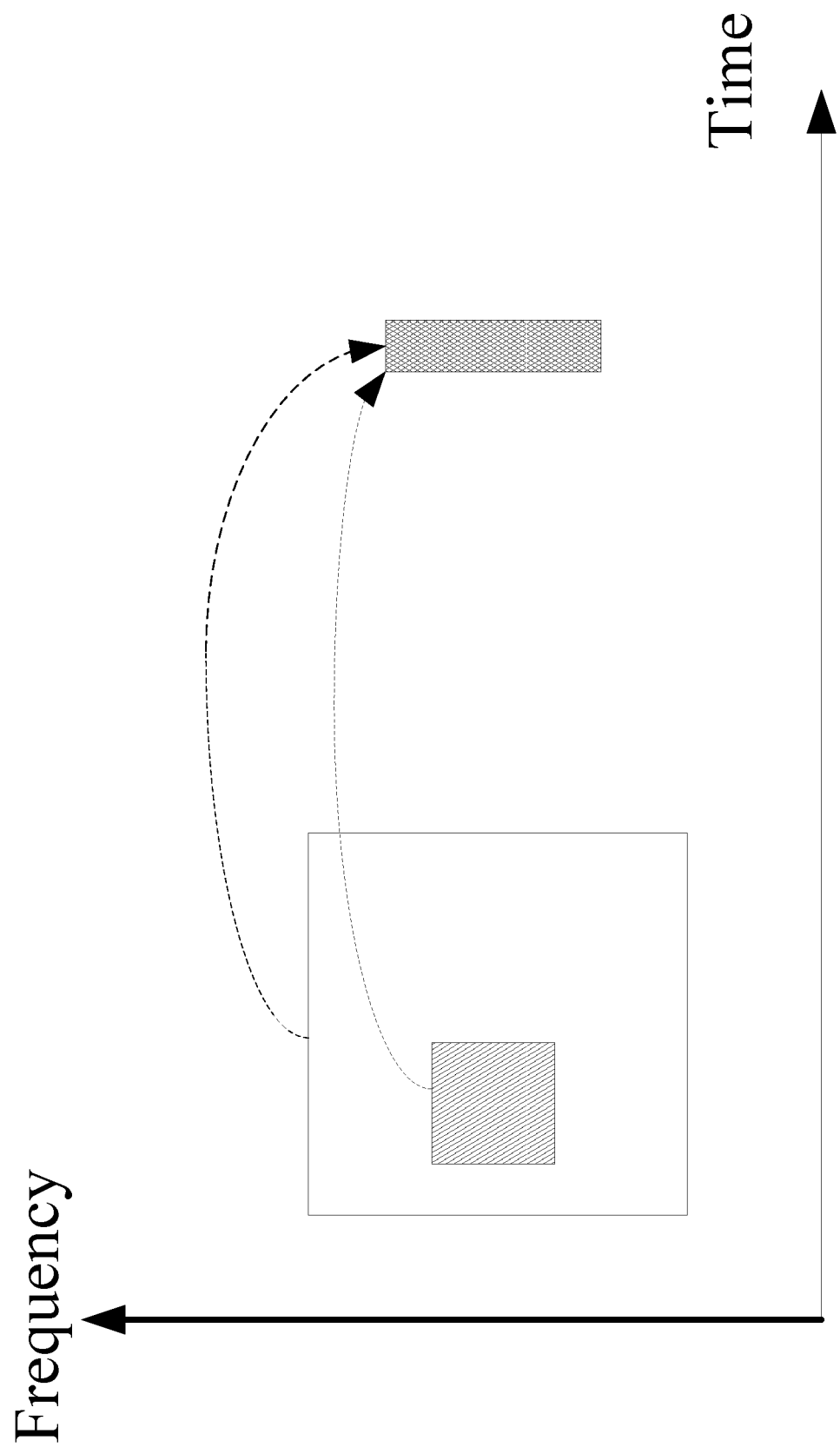
FIG. 13 illustrates a flowchart of a first signaling, a first signal and a second signal according to one embodiment of the present disclosure.

Embodiment 13 illustrates a schematic diagram of relationships among a first signaling, a first signal and a second signal according to one embodiment of the present disclosure, as shown in FIG. 13. In FIG. 13, the horizontal axis represents time, the vertical axis represents frequency, the rectangle filled with slashes represents time-frequency resources occupied by a first signaling, the area outside the rectangle filled with slashes in the area surrounded by a bold frame represents time-frequency resources occupied by a first signal, and the rectangle filled with crossing lines represents time-frequency resources occupied by a second signal.

In Embodiment 13, the second signal in the present disclosure is used for determining whether the first signal in the present disclosure is correctly received; a first sequence is used for generating the second signal; at least one of time-frequency resources occupied by the first signaling in the present disclosure or time-frequency resources occupied by the first signal is used for determining time-frequency resources occupied by the second signal, or at least one of time-frequency resources occupied by the first signaling or time-frequency resources occupied by the first signal is used for determining the first sequence, or at least one of time-frequency resources occupied by the first signaling or time-frequency resources occupied by the first signal is used for determining time-frequency resources occupied by the second signal and the first sequence.

In one embodiment, the second signal is a baseband signal.

In one embodiment, the second signal is a radio-frequency signal.

In one embodiment, the second signal is transmitted through an air interface.

In one embodiment, the second signal is transmitted through a radio interface.

In one embodiment, the second signal is transmitted through a PC5 interface.

In one embodiment, the second signal is transmitted through a Uu interface.

In one embodiment, the second signal is transmitted through a Sidelink.

In one embodiment, the second signal is transmitted through a Physical Sidelink Feedback Channel (PSFCH).

In one embodiment, all or part of a signature sequence is used for generating the second signal.

In one embodiment, the second signal carries all or part of Sidelink Feedback Control Information (SFCI).

In one embodiment, the second signal carries Hybrid Automatic Repeat Request (HARQ) feedback.

In one embodiment, the second signal carries Hybrid Automatic Repeat Request (HARQ) Non-Acknowledge (NACK) feedback.

In one embodiment, the above phrase monitoring a second signal is realized by performing an energy detection on the second signal.

In one embodiment, the above phrase monitoring a second signal is realized by performing a sequence detection on the second signal.

In one embodiment, the above phrase monitoring a second signal is realized by performing an energy detection and a sequence detection on the second signal.

In one embodiment, the above phrase monitoring a second signal includes the following meaning: whether the second signal is transmitted is monitored.

In one embodiment, the above phrase monitoring a second signal includes the following meaning: whether the second signal carries a signature sequence is monitored.

In one embodiment, the above phrase that the second signal is used for determining whether the first signal is received correctly includes the following meaning: the second signal is used for determining that the first signal is not received correctly.

In one embodiment, the above phrase that the second signal is used for determining whether the first signal is received correctly includes the following meaning: the second signal is used for determining that the first signal is received correctly.

In one embodiment, the above phrase that the second signal is used for determining whether the first signal is received correctly includes the following meaning: the second signal is used by the first communication node in the present disclosure for determining whether the first signal is received correctly.

In one embodiment, the above phrase that the second signal is used for determining whether the first signal is received correctly includes the following meaning: the second signal is used for directly indicating whether the first signal is received correctly.

In one embodiment, the above phrase that the second signal is used for determining whether the first signal is received correctly includes the following meaning: the second signal is used for indirectly indicating whether the first signal is received correctly.

In one embodiment, the above phrase that the second signal is used for determining whether the first signal is received correctly includes the following meaning: the second signal is used for explicitly indicating whether the first signal is received correctly.

In one embodiment, the above phrase that the second signal is used for determining whether the first signal is received correctly includes the following meaning: the second signal is used for implicitly indicating whether the first signal is received correctly.

In one embodiment, the above phrase that the second signal is used for determining whether the first signal is correctly received includes the following meaning: the second signal determines whether the first signal is correctly received by whether it is detected or not.

In one embodiment, the above phrase that the second signal is used for determining whether the first signal is received correctly includes the following meaning: when the second signal is detected, the first communication node assumes that the first signal is not received correctly, otherwise the first communication node assumes that the first signal is received correctly.

In one embodiment, the above phrase that whether the first signal is correctly received refers to: whether the first signal is correctly decoded.

In one embodiment, the above phrase that whether the first signal is correctly received refers to: whether the first signal channel decoding is successful.

In one embodiment, the above phrase that whether the first signal is correctly received refers to: the first communication node in the present disclosure assumes whether the first signal is correctly received.

In one embodiment, the above phrase that whether the first signal is correctly received refers to: whether the first signal passes a CRC-check after a channel decoding.

In one embodiment, the above phrase that whether the first signal is correctly received refers to: whether a Code Block (CB) carried by the first signal passes a CB-level CRC check after a channel decoding.

In one embodiment, the above phrase that whether the first signal is correctly received refers to: whether a Transport Block (TB) carried by the first signal passes a TB-level CRC check after a channel decoding.

In one embodiment, the first sequence is a Zadoff-Chu (ZC) sequence.

In one embodiment, the first sequence is composed of all or part of elements in a ZC sequence.

In one embodiment, the first sequence is a pseudo-random sequence.

In one embodiment, the first sequence is an m sequence.

In one embodiment, the first sequence is a Gold sequence.

In one embodiment, the first sequence is a Low Peak to Average Power Ratio (PAPR) sequence.

In one embodiment, the first sequence is obtained by transforming a ZC sequence.

In one embodiment, the first sequence is obtained by a ZC sequence through a Cyclic Shift.

In one embodiment, a length of the first sequence is equal to a positive integral multiple of 12.

In one embodiment, the above phrase that a first sequence is used for generating the second signal includes the following meaning: the first sequence generates the second signal successively through Mapping To Physical Resources, OFDM Baseband Signal Generation, and Modulation and Upconversion.

In one embodiment, the above phrase that a first sequence is used for generating the second signal includes the following meaning: the first sequence generates the second signal successively through Mapping To Physical Resources and OFDM Baseband Signal Generation.

In one embodiment, at least one of time-frequency resources occupied by the first signaling or time-frequency resources occupied by the first signal refers to time-frequency resources occupied by the first signaling and time-frequency resources occupied by the first signal.

In one embodiment, at least one of time-frequency resources occupied by the first signaling or time-frequency resources occupied by the first signal refers to time-frequency resources occupied by the first signaling.

In one embodiment, at least one of time-frequency resources occupied by the first signaling or time-frequency resources occupied by the first signal refers to time-frequency resources occupied by the first signal.

In one embodiment, the above phrase that at least one of time-frequency resources occupied by the first signaling or time-frequency resources occupied by the first signal is used for determining time-frequency resources occupied by the second signal includes the following meaning: at least one of a position of time-frequency resources occupied by the first signaling in time-frequency domain or a position of time-frequency resources occupied by the first signal in time-frequency domain is used for determining time-frequency resources occupied by the second signal.

In one embodiment, the above phrase that at least one of time-frequency resources occupied by the first signaling or time-frequency resources occupied by the first signal is used for determining the first sequence includes the following meaning: at least one of a position of time-frequency resources occupied by the first signaling in time-frequency domain or a position of time-frequency resources occupied by the first signal in time-frequency domain is used for determining an index of the first sequence.

In one embodiment, the above phrase that at least one of time-frequency resources occupied by the first signaling or time-frequency resources occupied by the first signal is used for determining time-frequency resources occupied by the second signal and the first sequence includes the following meaning: at least one of a position of time-frequency resources occupied by the first signaling in time-frequency domain or a position of time-frequency resources occupied by the first signal in time-frequency domain is used for determining time-frequency resources occupied by the second signal and an index of the first sequence.

In one embodiment, the above phrase that at least one of time-frequency resources occupied by the first signaling or time-frequency resources occupied by the first signal is used for determining time-frequency resources occupied by the second signal includes the following meaning: at least one of a quantity of time-frequency resources occupied by the first signaling or a quantity of time-frequency resources occupied by the first signal is used for determining time-frequency resources occupied by the second signal.

In one embodiment, the above phrase that at least one of time-frequency resources occupied by the first signaling or time-frequency resources occupied by the first signal is used for determining the first sequence includes the following meaning: at least one of a quantity of time-frequency resources occupied by the first signaling in time-frequency domain or a quantity of time-frequency resources occupied by the first signal in time-frequency domain is used for determining an index of the first sequence.

In one embodiment, the above phrase that at least one of time-frequency resources occupied by the first signaling or time-frequency resources occupied by the first signal is used for determining time-frequency resources occupied by the second signal and the first sequence includes the following meaning: at least one of a quantity of time-frequency resources occupied by the first signaling or a quantity of time-frequency resources occupied by the first signal is used for determining time-frequency resources occupied by the second signal and an index of the first sequence.

In one embodiment, the above phrase that at least one of time-frequency resources occupied by the first signaling or time-frequency resources occupied by the first signal is used for determining time-frequency resources occupied by the second signal includes the following meaning: at least one of time-frequency resources occupied by the first signaling or time-frequency resources occupied by the first signal is used for determining time-frequency resources occupied by the second signal based on a mapping relationship.

In one embodiment, the above phrase that at least one of time-frequency resources occupied by the first signaling or time-frequency resources occupied by the first signal is used for determining the first sequence includes the following meaning: at least one of time-frequency resources occupied by the first signaling or time-frequency resources occupied by the first signal is used for determining an index of the first sequence based on a mapping relationship.

In one embodiment, the above phrase that at least one of time-frequency resources occupied by the first signaling or time-frequency resources occupied by the first signal is used for determining time-frequency resources occupied by the second signal and the first sequence includes the following meaning: at least one of time-frequency resources occupied by the first signaling or time-frequency resources occupied by the first signal is used for determining time-frequency resources occupied by the second signal and an index of the first sequence.

Embodiment 14

Figure 14:
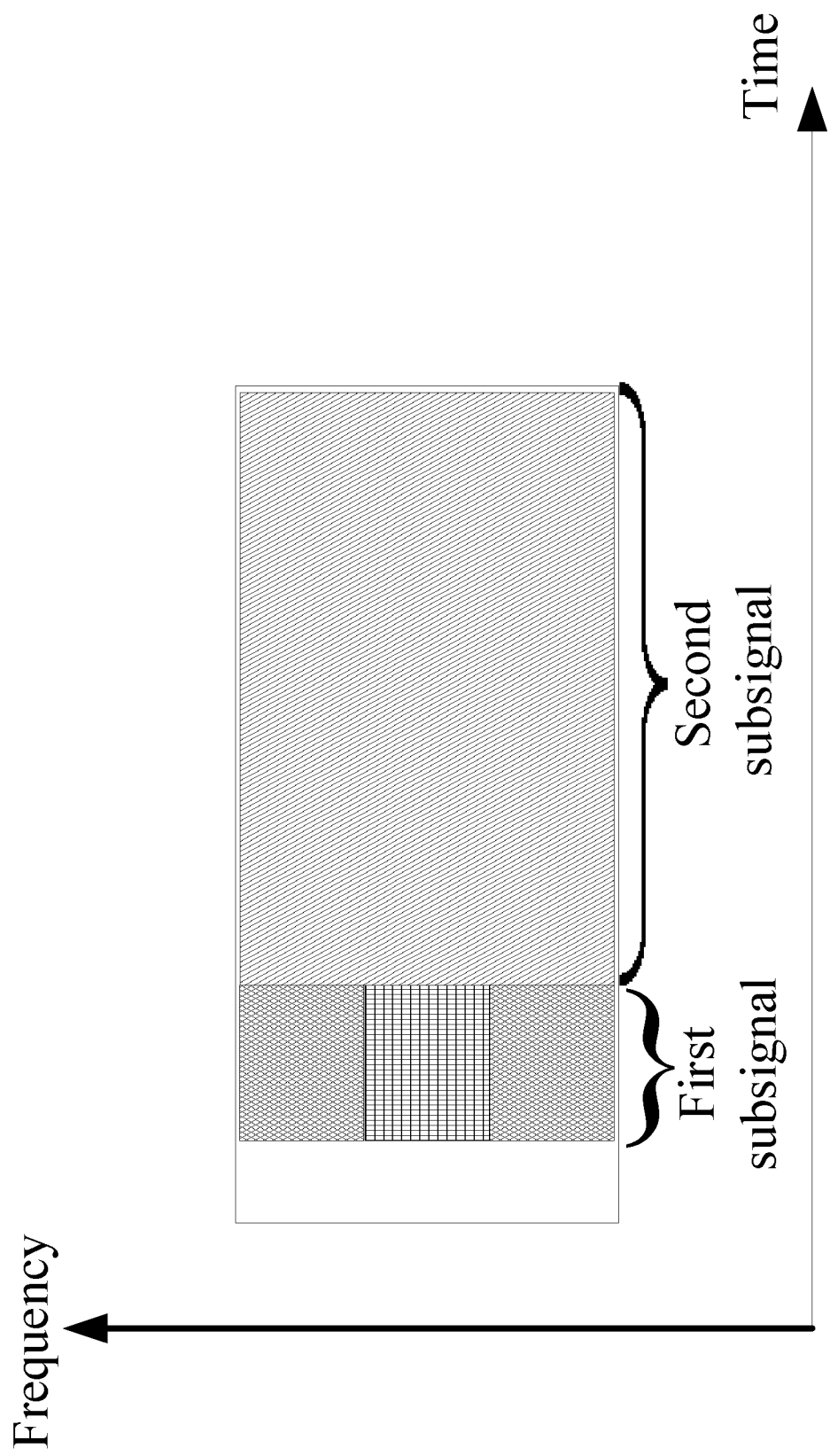
FIG. 14 illustrates a schematic diagram of a first sub-signal and a second sub-signal according to one embodiment of the present disclosure.

Embodiment 14 illustrates a schematic diagram of a first sub-signal and a second sub-signal according to one embodiment of the present disclosure, as shown in FIG. 14. In FIG. 14, the horizontal axis represents time, the vertical axis represents frequency, the rectangle filled with slashes represents time-frequency resources occupied by a second sub-signal, the area outside the rectangle filled with reticles in the area surrounded by a bold frame represents time-frequency resources occupied by a first signal, and the rectangle filled with crossing lines represents time-frequency resources occupied by a first sub-signal.

In Embodiment 14, the first signal in the present disclosure comprises a first sub-signal and a second sub-signal, and frequency-domain resources occupied by the first sub-signal are different from frequency-domain resources occupied by the second sub-signal; frequency-domain resources occupied by the second sub-signal comprise frequency-domain resources occupied by the first sub-signal, and time-domain resources occupied by the first sub-signal and time-domain resources occupied by the second sub-signal are orthogonal in time domain; a smaller value between the first power in the present disclosure and the second power in the present disclosure is used for determining transmitting power of the second sub-signal, and transmitting power of the second sub-signal, a bandwidth of frequency-domain resources occupied by the second sub-signal and a bandwidth of frequency-domain resources occupied by the first sub-signal are used together for determining transmitting power of the first sub-signal.

In one embodiment, a first Transport Block (TB) is used for generating the first signal, the first TB being also used for generating the first sub-signal and the second sub-signal.

In one embodiment, a Power Spectrum Density (PSD) of transmitting power of the first sub-signal is equal to a PSD of transmitting power of the second sub-signal.

In one embodiment, a PSD of transmitting power of the first sub-signal is not equal to a PSD of transmitting power of the second sub-signal.

In one embodiment, a number of frequency-domain resources occupied by the second sub-signal is greater than a number of frequency-domain resources occupied by the first sub-signal.

In one embodiment, a number of subcarriers comprised in frequency-domain resources occupied by the second sub-signal is greater than a number of subcarriers comprised in frequency-domain resources occupied by the first sub-signal.

In one embodiment, a bandwidth of frequency-domain resources occupied by the second sub-signal is greater than a bandwidth of frequency-domain resources occupied by the first sub-signal.

In one embodiment, a number of frequency-domain resources occupied by the second sub-signal is equal to a sum of a number of frequency-domain resources occupied by the first sub-signal and a number of frequency-domain resources occupied by the first signaling.

In one embodiment, a number of subcarriers comprised in frequency-domain resources occupied by the second sub-signal is equal to a sum of a number of subcarriers comprised in frequency-domain resources occupied by the first sub-signal and a number of subcarriers comprised in frequency-domain resources occupied by the first signaling.

In one embodiment, a bandwidth of frequency-domain resources occupied by the second sub-signal is equal to a sum of a bandwidth of frequency-domain resources occupied by the first sub-signal and a bandwidth of frequency-domain resources occupied by the first signaling.

In one embodiment, the above phrase that time-domain resources occupied by the first sub-signal and time-domain resources occupied by the second sub-signal are orthogonal in time domain includes the following meaning: there do not exist time-domain resources belong to time-domain resources occupied by the first sub-signal and time-domain resources occupied by the second sub-signal at the same time.

In one embodiment, the above phrase that time-domain resources occupied by the first sub-signal and time-domain resources occupied by the second sub-signal are orthogonal in time domain includes the following meaning: time-domain resources occupied by the first sub-signal and time-domain resources occupied by the second sub-signal are Non-overlapped.

In one embodiment, the above phrase that a smaller value between the first power and the second power is used for determining transmitting power of the second sub-signal" includes the following meaning: a smaller value between the first power and the second power is used by the first communication node in the present disclosure for determining transmitting power of the second sub-signal.

In one embodiment, the above phrase that a smaller value between the first power and the second power is used for determining transmitting power of the second sub-signal" includes the following meaning: a smaller value between the first power and the second power is equal to transmitting power of the second sub-signal.

In one embodiment, the above phrase that a smaller value between the first power and the second power is used for determining transmitting power of the second sub-signal" includes the following meaning: a smaller value between the first power and the second power as well with third power are used together for determining transmitting power of the second sub-signal.

In one embodiment, the above phrase that a smaller value between the first power and the second power is used for determining transmitting power of the second sub-signal" includes the following meaning: a smaller value between the first power and the second power is equal to a first value, a smaller value between the first value and third power is equal to transmitting power of the second sub-signal, and the third power is equal to the configured maximum output power of the first communication node.

In one embodiment, the above phrase that a smaller value between the first power and the second power is used for determining transmitting power of the second sub-signal" includes the following meaning: a smaller value between the first power and the second power is equal to a first value, a smaller value between the first value and third power is equal to transmitting power of the second sub-signal, and the third power is equal to maximum output power relevant with a Channel Busy Ratio (CBR).

In one embodiment, the above phrase that a smaller value between the first power and the second power is used for determining transmitting power of the second sub-signal" includes the following meaning: a smaller value between the first power and the second power is equal to a first value, a smaller value between the first value and third power is equal to transmitting power of the second sub-signal, and the third power is equal to transmitting power calculated by an uplink pathloss adopted by the first communication node when assuming to transmit a Sidelink signal.

In one embodiment, the above phrase that a smaller value between the first power and the second power is used for determining transmitting power of the second sub-signal" includes the following meaning: a small value compared among the first power, the second power, third power and fourth power is equal to transmitting power of the second sub-signal, the third power is equal to the configured maximum output power of the first communication node, and the fourth power is equal to maximum output power relevant with a CBR.

In one embodiment, the above phrase that a smaller value between the first power and the second power is used for determining transmitting power of the second sub-signal" includes the following meaning: a smaller value between the first power and the second power is used for determining a PSD of transmitting power of the second sub-signal.

In one embodiment, the above phrase that a smaller value between the first power and the second power is used for determining transmitting power of the second sub-signal" is realized by the following formula:

$$P_{SL\_2}=\min\{P_{max},P'_{SL}(PL_{SL})\}$$

Wherein $P_{SL\_2}$ represents transmitting power of the second sub-signal, $P_{max}$ represents the first power and $P'_{SL}(PL_{SL})$ represents the second power.

In one embodiment, the above phrase that a smaller value between the first power and the second power is used for determining transmitting power of the second sub-signal" is realized by the following formula:

$$P_{SL\_2}=\min\{P_{max},P_{max\_CBR},P'_{SL}(PL_{SL})\}$$

wherein $P_{SL\_2}$ represents transmitting power of the second sub-signal, $P_{max}$ represents the first power, $P'_{SL}(PL_{SL})$ represents the second power, and $P_{max\_CBR}$ represents maximum output power relevant with a CBR.

In one embodiment, the above phrase that a smaller value between the first power and the second power is used for determining transmitting power of the second sub-signal" is realized by the following formula:

$$P_{SL\_2}=\min\{P_{max},P'_{SL}(PL_{SL}),P'_{max}(PL_{UL})\}$$

wherein $P_{SL\_2}$ represents transmitting power of the second sub-signal, $P_{max}$ represents the first power, $P'_{SL}(PL_{SL})$ represents the second power, and $P'_{max}(PL_{UL})$ represents transmitting power calculated by an uplink pathloss adopted by the first communication node when assuming to transmit a Sidelink signal.

In one embodiment, the above phrase that a smaller value between the first power and the second power is used for determining transmitting power of the second sub-signal" is realized by the following formula:

$$P_{SL\_2}=\min\{P_{max},P_{max\_CBR},P'_{SL}(PL_{SL}),P'_{max}(PL_{UL})\}$$

wherein $P_{SL\_2}$ represents transmitting power of the second sub-signal, $P_{max}$ represents the first power, $P'_{SL}(PL_{SL})$ represents the second power, $P_{max\_CBR}$ represents maximum output power relevant with a Channel Busy Ratio (CBR), and $P'_{max}(PL_{UL})$ represents transmitting power calculated by an uplink pathloss adopted by the first communication node when assuming to transmit a Sidelink signal.

In one embodiment, the above phrase that transmitting power of the second sub-signal, a bandwidth of frequency-domain resources occupied by the second sub-signal and a bandwidth of frequency-domain resources occupied by the first sub-signal are used together for determining transmitting power of the first sub-signal includes the following meaning: a ratio of transmitting power of the second sub-signal to a bandwidth of frequency-domain resources occupied by the second sub-signal is equal to a first PSD, a product of the first PSD and a bandwidth of frequency-domain resources occupied by the first sub-signal is equal to transmitting power of the first sub-signal, and both transmitting power of the first sub-signal and transmitting power of the second sub-signal are measured by W or mW.

In one embodiment, the above phrase that transmitting power of the second sub-signal, a bandwidth of frequency-domain resources occupied by the second sub-signal and a bandwidth of frequency-domain resources occupied by the first sub-signal are used together for determining transmitting power of the first sub-signal includes the following meaning: a ratio of transmitting power of the second sub-signal to a bandwidth of frequency-domain resources occupied by the second sub-signal is equal to a first PSD; for a bandwidth of frequency-domain resources occupied by the given first PSD, transmitting power of the first sub-signal and a bandwidth of frequency-resources occupied by the first sub-signal are linearly correlated, transmitting power of the first sub-signal and transmitting power of the second sub-signal are both measured by W or mW.

In one embodiment, the above phrase that transmitting power of the second sub-signal, a bandwidth of frequency-domain resources occupied by the second sub-signal and a bandwidth of frequency-domain resources occupied by the first sub-signal are used together for determining transmitting power of the first sub-signal includes the following meaning: a ratio of a bandwidth of frequency-domain resources occupied by the second sub-signal to a bandwidth of frequency-domain resources occupied by the first sub-signal is equal to a first bandwidth ratio; transmitting power of the first sub-signal is equal to a difference value between transmitting power of the second sub-signal minus 10 times of a base-10 logarithm of the first bandwidth ratio, and transmitting power of the first sub-signal and transmitting power of the second sub-signal are both measured by dBm.

In one embodiment, the above phrase that transmitting power of the second sub-signal, a bandwidth of frequency-domain resources occupied by the second sub-signal and a bandwidth of frequency-domain resources occupied by the first sub-signal are used together for determining transmitting power of the first sub-signal includes the following meaning: a ratio of a bandwidth of frequency-domain resources occupied by the second sub-signal to a bandwidth of frequency-domain resources occupied by the first sub-signal is equal to a first bandwidth ratio; for the given transmitting power of the second sub-signal, transmitting power of the first sub-signal is linearly related to a base-10 logarithm of the first bandwidth ratio, and transmitting power of the first sub-signal and transmitting power of the second sub-signal are both measured by dBm.

In one embodiment, the above phrase that transmitting power of the second sub-signal, a bandwidth of frequency-domain resources occupied by the second sub-signal and a bandwidth of frequency-domain resources occupied by the first sub-signal are used together for determining transmitting power of the first sub-signal is realized by the following formula:

$$P_{SL\_1} = P_{SL\_2} \times \frac{W_1}{W_2}$$

wherein $P_{SL\_1}$ represents transmitting power (being measured in W or mW) of the first sub-signal, $P_{SL\_2}$ represents transmitting power (being measured in W or mW) of the second sub-signal, $W_1$ represents a bandwidth of frequency-domain resources occupied by the first sub-signal, and $W_2$ represents a bandwidth of frequency-domain resources occupied by the second sub-signal.

In one embodiment, the above phrase that transmitting power of the second sub-signal, a bandwidth of frequency-domain resources occupied by the second sub-signal and a bandwidth of frequency-domain resources occupied by the first sub-signal are used together for determining transmitting power of the first sub-signal is realized by the following formula:

$$P_{SL\_1} = P_{SL\_2} - 10\log_{10}\frac{W_2}{W_1}$$

wherein $P_{SL\_1}$ represents transmitting power (a unit of measurement is dBm) of the first sub-signal, $P_{SL\_2}$ represents transmitting power (a unit of measurement is dBm) of the second sub-signal, $W_1$ represents a bandwidth of frequency-domain resources occupied by the first sub-signal, and $W_2$ represents a bandwidth of frequency-domain resources occupied by the second sub-signal.

In one embodiment, the above phrase that transmitting power of the second sub-signal, a bandwidth of frequency-domain resources occupied by the second sub-signal and a bandwidth of frequency-domain resources occupied by the first sub-signal are used together for determining transmitting power of the first sub-signal is realized by the following formula:

$$P_{SL\_1} = P_{SL\_2} \times \frac{W_1}{10^{\frac{3}{10}} \times W_2 - 10^{\frac{3}{10}} \times W_1 + W_1}$$

wherein $P_{SL\_1}$ represents transmitting power (a unit of measurement is W or mW) of the first sub-signal, $P_{SL\_2}$ represents transmitting power (a unit of measurement is W or mW) of the second sub-signal, $W_1$ represents a bandwidth of frequency-domain resources occupied by the first sub-signal, and $W_2$ represents a bandwidth of frequency-domain resources occupied by the second sub-signal.

In one embodiment, the above phrase that transmitting power of the second sub-signal, a bandwidth of frequency-domain resources occupied by the second sub-signal and a bandwidth of frequency-domain resources occupied by the first sub-signal are used together for determining transmitting power of the first sub-signal is realized by the following formula:

$$P_{SL\_1} = P_{SL\_2} + 10\log_{10}\left(\frac{W_1}{10^{\frac{3}{10}} \times W_2 - 10^{\frac{3}{10}} \times W_1 + W_1}\right)$$

wherein $P_{SL\_1}$ represents transmitting power (a unit of measurement is dBm) of the first sub-signal, $P_{SL\_2}$ represents transmitting power (a unit of measurement is dBm) of the second sub-signal, $W_1$ represents a bandwidth of frequency-domain resources occupied by the first sub-signal, and $W_2$ represents a bandwidth of frequency-domain resources occupied by the second sub-signal.

In one embodiment, the above phrase that transmitting power of the second sub-signal, a bandwidth of frequency-domain resources occupied by the second sub-signal and a bandwidth of frequency-domain resources occupied by the first sub-signal are used together for determining transmitting power of the first sub-signal includes the following meaning: a ratio of transmitting power of the second sub-signal to a bandwidth of frequency-domain resources occupied by the second sub-signal is equal to a first PSD, and a difference value between a bandwidth of frequency-domain resources occupied by the second sub-signal and a bandwidth of frequency-domain resources occupied by the first sub-signal is equal to a first bandwidth; for the given first PSD, a difference value between transmitting power of the second sub-signal and transmitting power of the first sub-signal is linearly correlated with the first bandwidth; transmitting power of the first sub-signal and transmitting power of the second sub-signal are both measured by W or mW.

In one embodiment, the above phrase that transmitting power of the second sub-signal, a bandwidth of frequency-domain resources occupied by the second sub-signal and a bandwidth of frequency-domain resources occupied by the first sub-signal are used together for determining transmitting power of the first sub-signal includes the following meaning: a ratio of transmitting power of the second sub-signal to a bandwidth of frequency-domain resources occupied by the second sub-signal is equal to a first PSD, and a difference value between a bandwidth of frequency-domain resources occupied by the second sub-signal and a bandwidth of frequency-domain resources occupied by the first sub-signal is equal to a first bandwidth; a difference between transmitting power of the second sub-signal and transmitting power of the first sub-signal is equal to $$10^{\frac{3}{10}}$$

multiple of a product of the first bandwidth and the first PSD; transmitting power of the first sub-signal and transmitting power of the second sub-signal are both measured by W or mW.

In one embodiment, the above phrase that transmitting power of the second sub-signal, a bandwidth of frequency-domain resources occupied by the second sub-signal and a bandwidth of frequency-domain resources occupied by the first sub-signal are used together for determining transmitting power of the first sub-signal includes the following meaning: a difference value between a bandwidth of frequency-domain resources occupied by the second sub-signal and a bandwidth of frequency-domain resources occupied by the first sub-signal is equal to a first bandwidth; a ratio of a bandwidth of frequency-domain resources occupied by the first sub-signal to a sum of a bandwidth of frequency-domain resources occupied by the first sub-signal and $$10^{\frac{3}{10}}$$

multiple of the first bandwidth is equal to a second bandwidth ratio; for given transmitting power of the second sub-signal, transmitting power of the first sub-signal is linearly related to a base-10 logarithm of the second bandwidth ratio, and transmitting power of the first sub-signal and transmitting power of the second sub-signal are both measured by dBm.

In one embodiment, the above phrase that transmitting power of the second sub-signal, a bandwidth of frequency-domain resources occupied by the second sub-signal and a bandwidth of frequency-domain resources occupied by the first sub-signal are used together for determining transmitting power of the first sub-signal includes the following meaning: a difference between a bandwidth of frequency-domain resources occupied by the second sub-signal and a bandwidth of frequency-domain resources occupied by the first sub-signal is equal to a first bandwidth; a ratio of a bandwidth of frequency-domain resources occupied by the first sub-signal to a sum of a bandwidth of frequency-domain resources occupied by the first sub-signal and $$10^{\frac{3}{10}}$$

multiple of the first bandwidth is equal to a second bandwidth ratio; transmitting power of the first sub-signal is equal to a sum of transmitting power of the second sub-signal plus 10 times of a base-10 logarithm of the second bandwidth ratio, and transmitting power of the first sub-signal and transmitting power of the second sub-signal are both measured by dBm.

Embodiment 15

Figure 15:
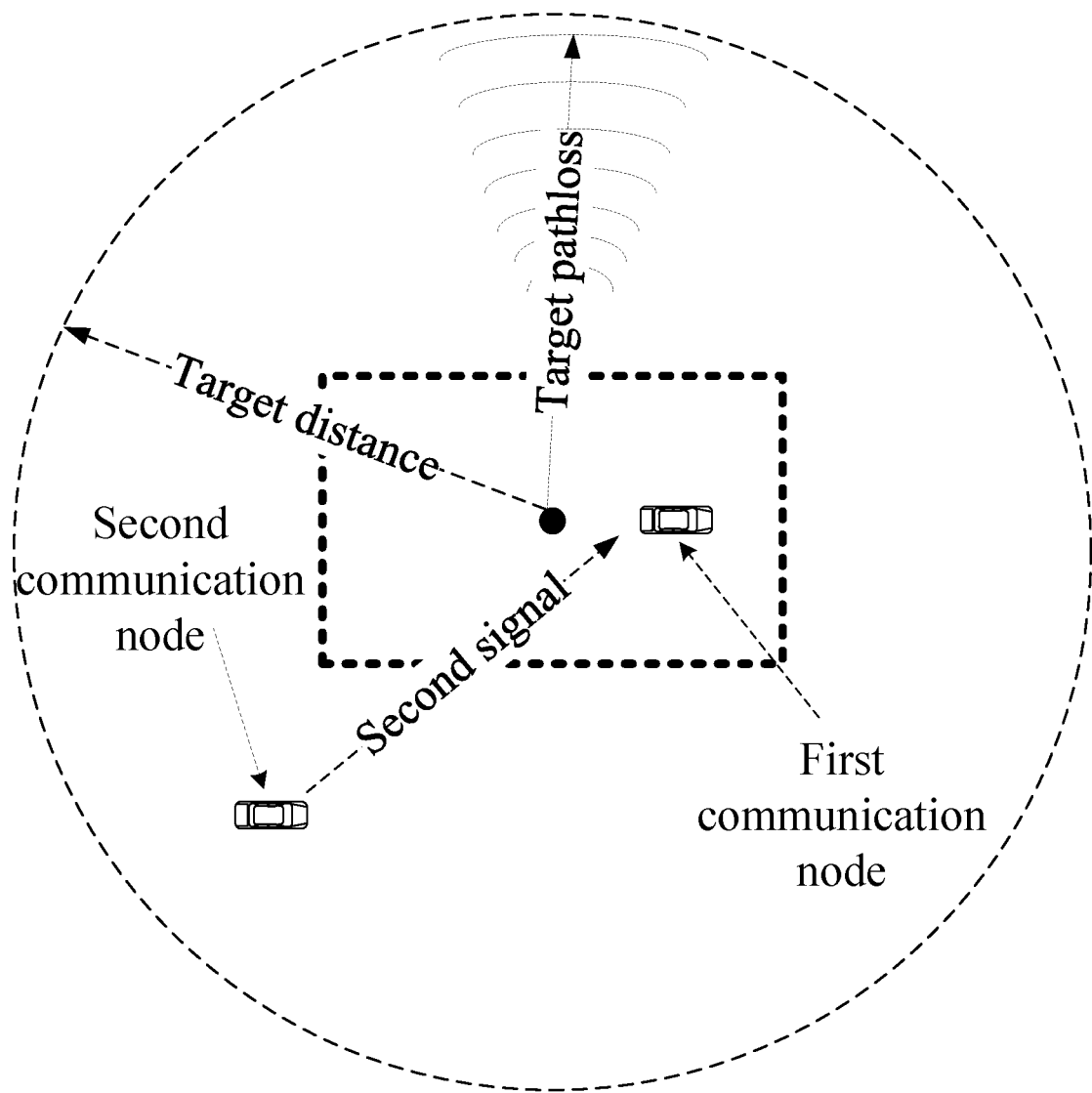
FIG. 15 illustrates a schematic diagram of relationships among a geographic location of a second communication node, a target pathloss, a target distance and a second signal according to one embodiment of the present disclosure.

Embodiment 15 illustrates a schematic diagram of relationships among a geographic location of a second communication node, a target pathloss, a target distance and a second radio according to one embodiment of the present disclosure, as shown in FIG. 15. In FIG. 15, a dotted circle is a circle with a radius of a target distance, and a dotted rectangle represents a zone where a first communication node is located.

In Embodiment 15, the second signal in the present disclosure is used for indicating that the first signal is not received correctly, the first signaling in the present disclosure is used for determining a target distance and time-frequency resources occupied by the first signal in the present disclosure, and the first signaling is also used for determining the target pathloss in the present disclosure; a geographic location of the second communication node, the target distance, and the target pathloss are used together for determining transmitting power of the second signal.

In one embodiment, the second communication node is currently In-Coverage.

In one embodiment, the second communication node is currently Out-of-Coverage.

In one embodiment, a geographic location of the second communication node is a current geographic location of the second communication node.

In one embodiment, a geographic location of the second communication node is a current geographic location of the second communication node as assumed by the second communication node.

In one embodiment, a geographic location of the second communication node is a current geographic location obtained by the second communication node through a measurement.

In one embodiment, a geographic location of the second communication node is a current real geographic location of the second communication node.

In one embodiment, a geographic location of the second communication node is a geographic location other than a current real geographic location of the second communication node.

In one embodiment, a geographic location of the second communication node is a current geographic location obtained by the second communication node through positioning.

In one embodiment, a geographic location of the second communication node is a current geographic location obtained by the second communication node through satellite positioning.

In one embodiment, a geographic location of the second communication node is a current geographic location obtained by the second communication node through satellite positioning and a measurement.

In one embodiment, the geographic location of the second communication node is the latitude distance and longitude distance of (0,0) coordinate point in the second communication node and the WGS84 model (Military Standard WGS84 Metric MIL-STD-2401 (11 Jan. 1994): "Military Standard Department of Defence World Geodetic System (WGS)").

In one embodiment, the above phrase that a geographic location of the second communication node, the target distance, and the target pathloss are used together for determining transmitting power of the second signal includes the following meaning: a geographic location of the second communication node, the target distance, and the target pathloss are used together by the second communication node for determining transmitting power of the second signal.

In one embodiment, the above phrase that a geographic location of the second communication node, the target distance, and the target pathloss are used together for determining transmitting power of the second signal includes the following meaning: the first signaling is also used for determining a first zone, and a first reference location is a geographic location in the first zone; a distance between a geographic location of the second communication node and the first reference location, the target distance, and the target pathloss are used together for determining transmitting power of the second signal.

In one embodiment, the above phrase that a geographic location of the second communication node, the target distance, and the target pathloss are used together for determining transmitting power of the second signal includes the following meaning: the first signaling is also used for determining a first zone, and a first reference location is a predefined geographic location in the first zone; a distance between a geographic location of the second communication node and the first reference location, the target distance, and the target pathloss are used together for determining transmitting power of the second signal.

In one embodiment, the above phrase that a geographic location of the second communication node, the target distance, and the target pathloss are used together for determining transmitting power of the second signal includes the following meaning: the first signaling is also used for determining a first zone, and a first reference location is a geographic location where a central longitude line in a longitude interval occupied by the first zone meets a central latitude line in a latitude interval occupied by the first zone; a distance between a geographic location of the second communication node and the first reference location, the target distance, and the target pathloss are used together for determining transmitting power of the second signal.

In one embodiment, the above phrase that a geographic location of the second communication node, the target distance, and the target pathloss are used together for determining transmitting power of the second signal includes the following meaning: the first signaling is also used for determining a first zone, and a first reference location is a geographic location in the first zone; the phrase that a distance between a geographic location of the second communication node and the first reference location, the target distance, and the target pathloss are used together for determining transmitting power of the second signal is realized by the following formula:

$$P_{PSFCH} = P_0(\text{PSFCH}) + \alpha\_\text{PSFCH} \cdot PL_{PSFCH} + 10 \cdot \log_{10}(2^{\mu\_PSFCH} \cdot M_{PSFCH\_RB}) + \Delta_{TF\_PSFCH}$$

wherein $PL_{PSFCH} \log_{10}(d_{PSFCH}/d_{groupcast}) + P_{groupcast}$ wherein $P_{PSFCH}$ represents transmitting power of the second signal, $P_0(\text{PSFCH})$ and $\alpha\_\text{PSFCH}$ are configured or pre-configured, $\mu\_\text{PSFCH}$ represents an index of a Subcarrier Spacing (SCS) of a subcarrier occupied by the second signal, $M_{PSFCH\_RB}$ represents a quantity of Physical Resource Blocks (PRB) occupied by the second signal in frequency domain, $\Delta_{TF\_PSFCH}$ represents compensation amount of transmitting power of the second signal, $PL_{groupcast}$ represents a target pathloss, $d_{groupcast}$ represents a target distance, and $d_{PSFCH}$ represents a distance between a geographic location of the second communication node and the first reference location.

In one embodiment, the above phrase that a geographic location of the second communication node, the target distance, and the target pathloss are used together for determining transmitting power of the second signal includes the following meaning: the first signaling is also used for determining a first zone, and a first reference location is a geographic location in the first zone; a base-10 logarithm value of a ratio of a distance between a geographic location of the second communication node and the first reference location to the target distance is equal to a first logarithm value; for a given pathloss compensation ratio (or a factor, the value range is from 0 to 1), given transmitting power of the second signal is linearly correlated with the first logarithm value; and transmitting power of the second signal is measured by dBM.

In one embodiment, a geographic location of the second communication node and the target distance are also used for determining whether the second signal is transmitted.

Embodiment 16

Figure 16:
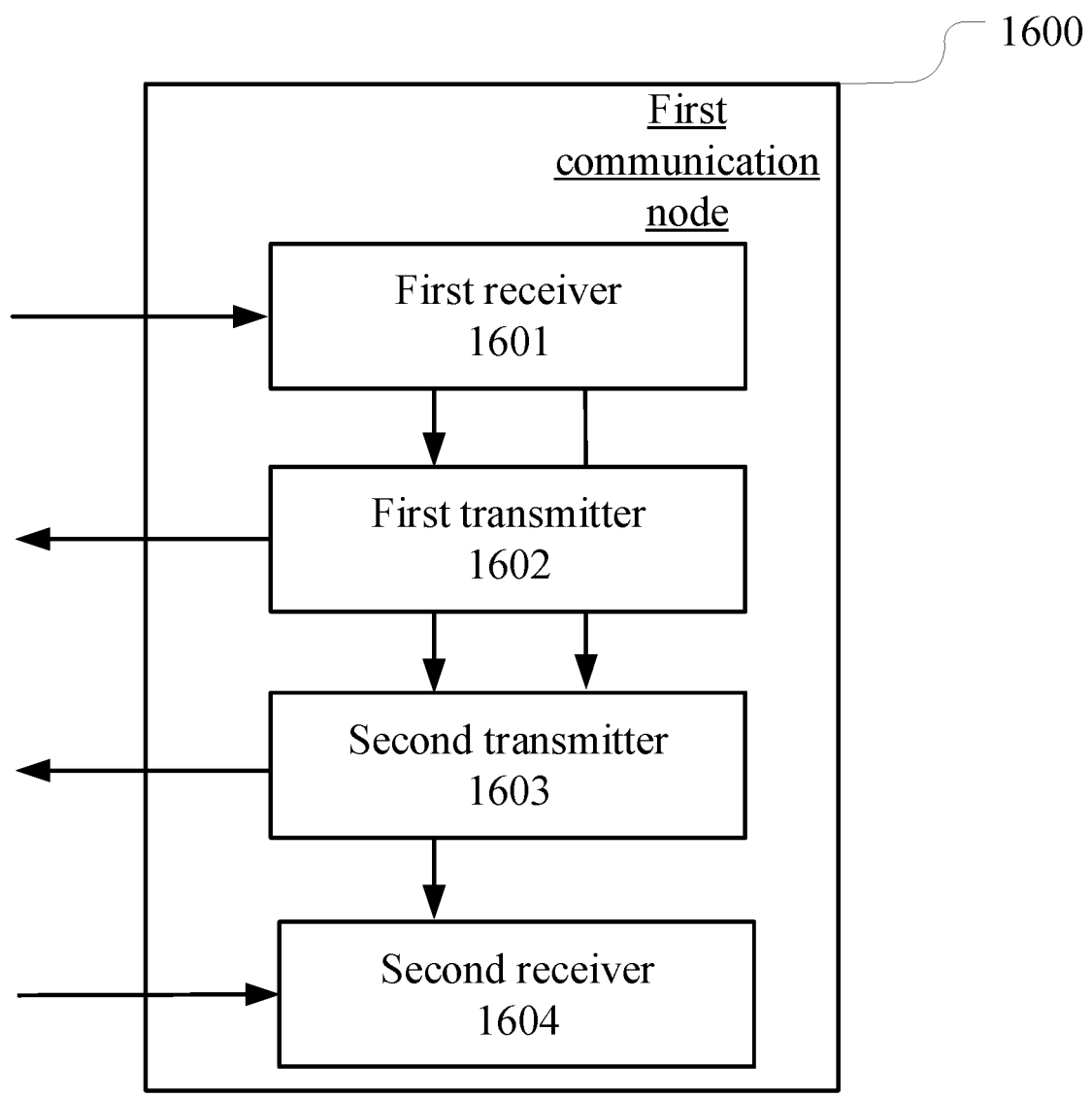
FIG. 16 illustrates a structure block diagram of a processing device in a first communication node according to one embodiment of the present disclosure.

Embodiment 16 illustrates the structure diagram of a processing device in a first communication node, as shown in FIG. 16. In FIG. 16, the first communication node processing device 1600 comprises the first receiver 1601, the first transmitter 1602, the second transmitter 1603, and the second receiver 1604. The first receiver 1601 comprises the transmitter/receiver 416 (including the antenna 420), the receiving processor 412 and the controller/processor 440 in FIG. 4 of the present disclosure; or the first receiver 1601 comprises the transmitter/receiver 556 (including the antenna 560), the receiving processor 552 and the controller/processor 590 in FIG. 5 of the present disclosure. The first transmitter 1602 comprises the transmitter/receiver 416 (including the antenna 420), the transmitting processor 415 and the controller/processor 440 in FIG. 4 of the present disclosure; or the first transmitter 1602 comprises the transmitter/receiver 556 (including the antenna 560), the transmitting processor 555 and the controller/processor 590 in FIG. 5 of the present disclosure; the second transmitter 1603 comprises the transmitter/receiver 416 (including the antenna 420), the transmitting processor 415 and the controller/processor 440 in FIG. 4 of the present disclosure; or the second transmitter 1603 comprises the transmitter/receiver 556 (including the antenna 560), the transmitting processor 555 and the controller/processor 590 in FIG. 5 of the present disclosure. The second receiver 1604 comprises the transmitter/receiver 416 (including the antenna 420) and the receiving processor 412 in FIG. 4 in the present disclosure; or the second receiver 1604 comprises the transmitter/receiver 556 (including the antenna 560) and the receiving processor 552 in FIG. 5 in the present disclosure.

In Embodiment 16, a first receiver 1601 receives first information and second information, the first information being used for determining a first power, the second information being used for determining a reference pathloss; the first transmitter 1602 transmits a first signaling; the second transmitter 1603 transmits a first signal; wherein the first signaling is used for indicating a target distance and time-frequency resources occupied by the first signal; the reference pathloss corresponds to a reference distance, the reference distance being greater than 0; a ratio between the target distance and the reference distance as well as the reference pathloss are used together for determining a target pathloss; the target pathloss is used for determining second power, and a smaller value between the first power and the second power is used for determining transmitting power of the first signal.

In one embodiment, the first receiver 1601 receives third information; wherein the third information is used for determining a target pathloss factor, a unit of the target pathloss and a unit of the reference pathloss are both dB; for a given ratio between the target distance and the reference distance, a difference value between the target pathloss and the reference pathloss is linearly related to the target pathloss factor.

In one embodiment, the reference pathloss and the reference distance belong to a reference candidate combination, the reference candidate combination being one of X candidate combinations, and the second information is used for a determining the reference candidate combination out of the X candidate combinations; and any of the X candidate combinations comprises a pathloss and a range, the X being a positive integer greater than 1.

In one embodiment, the second information comprises M sub-information-block(s), which is(are) respectively used for determining M pathloss(es), the M sub-information-block(s) being used for determining M zone identification(s) respectively, the M being a positive integer; any of the M zone identification(s) is used for identifying a geographic zone, and a geographic location of the first communication node is used for determining a target zone identification, the target zone identification being one of the M zone identification(s); the reference pathloss is one of the M pathloss(es), and a sub-information-block among the M sub-information-block(s) used for determining the reference pathloss is also used for determining the target zone identification.

In one embodiment, the first receiver 1601 performs a first measurement, the first measurement being used for determining a first measurement quantity; wherein the first measurement quantity is used for determining a first pathloss, the first information is used for determining a first parameter, the first pathloss together with the first parameter being used for determining the first power.

In one embodiment, the first receiver 1601 receives fourth information; wherein the fourth information is used for determining a second parameter, and the second parameter and the target pathloss are used for determining the second power.

In one embodiment, the first signaling is also used for indicating the target pathloss.

In one embodiment, the second receiver 1604 monitors a second signal; wherein the second signal is used for determining whether the first signal is correctly received; a first sequence is used for generating the second signal; at least one of time-frequency resources occupied by the first signaling or time-frequency resources occupied by the first signal is used for determining time-frequency resources occupied by the second signal, or at least one of the time-frequency resources occupied by the first signaling or the time-frequency resources occupied by the first signal is used for determining the first sequence, or at least one of the time-frequency resources occupied by the first signaling or the time-frequency resources occupied by the first signal is used for determining time-frequency resources occupied by the second signal and the first sequence.

In one embodiment, the first signal comprises a first sub-signal and a second sub-signal, and frequency-domain resources occupied by the first sub-signal are different from frequency-domain resources occupied by the second sub-signal; frequency-domain resources occupied by the second sub-signal comprise frequency-domain resources occupied by the first sub-signal, and time-domain resources occupied by the first sub-signal and time-domain resources occupied by the second sub-signal are orthogonal in time domain; a smaller value between the first power and the second power is used for determining transmitting power of the second sub-signal, and transmitting power of the second sub-signal, a bandwidth of frequency-domain resources occupied by the second sub-signal and a bandwidth of frequency-domain resources occupied by the first sub-signal are used together for determining transmitting power of the first sub-signal.

Embodiment 17

Figure 17:
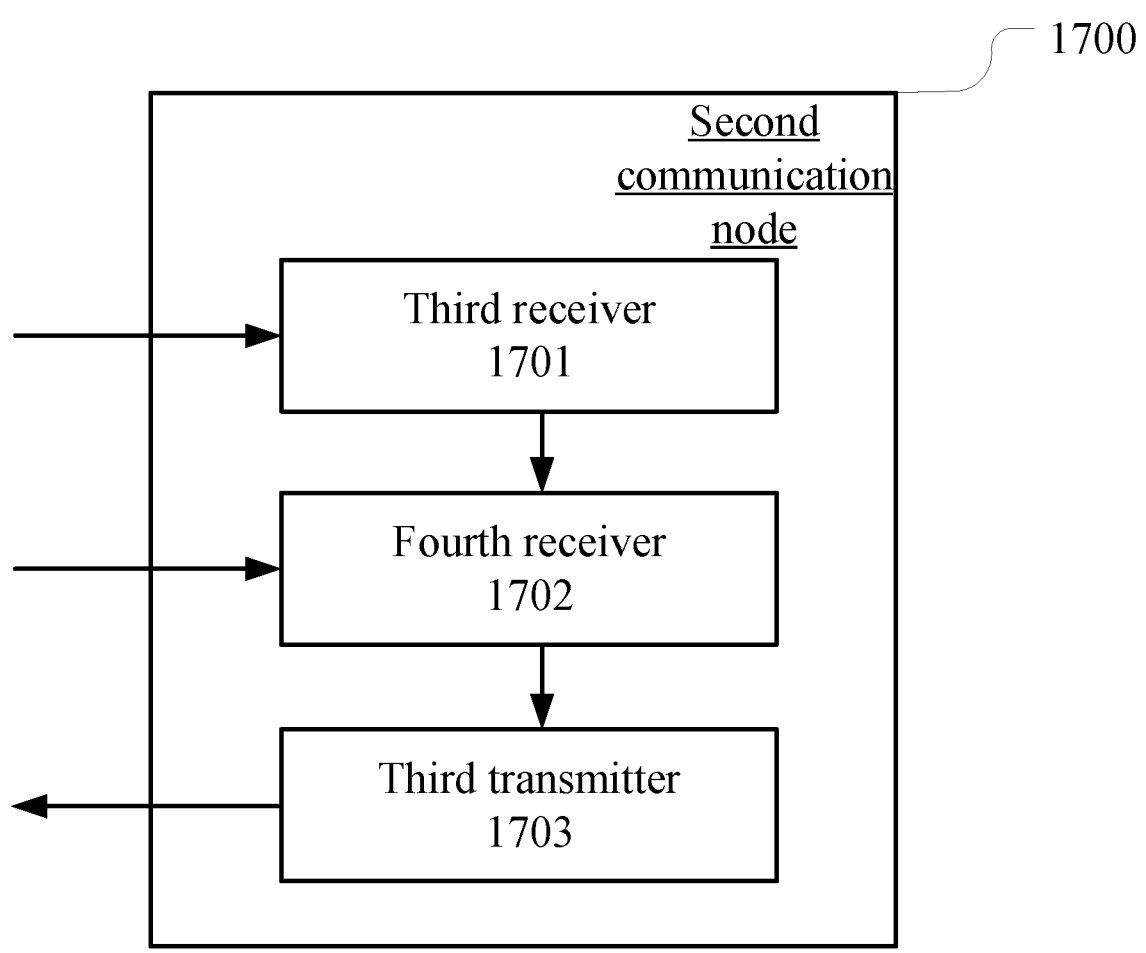
FIG. 17 illustrates a structure block diagram of a processing device in a second communication node according to one embodiment of the present disclosure.

Embodiment 17 illustrates a structural block diagram of a processing device of a second communication node according to one embodiment, as shown in FIG. 17. In FIG. 17, the second communication node processing device 1700 comprises the third receiver 1701, the fourth receiver 1702, and the third transmitter 1703. The third receiver 1701 comprises the transmitter/receiver 456 (including the antenna 460), the receiving processor 452 and the controller/processor 490 in FIG. 4 of the present disclosure; the fourth receiver 1702 comprises the transmitter/receiver 456 (including the antenna 460), the receiving processor 452 and the controller/processor 490 in FIG. of the present disclosure; the third transmitter 1703 comprises the transmitter/receiver 456 (including the antenna 460) and the transmitting processor 455 in FIG. 4 of the present disclosure.

In Embodiment 17, the third receiver 1701 receives a first signaling; the fourth receiver 1702 receives a first signal; the third transmitter 1703 transmits a second signal; wherein the second signal is used for indicating that the first signal is not correctly received, the first signaling is used for determining a target distance and time-frequency resources occupied by the first signal, and the first signaling is also used for determining the target pathloss; a geographic location of the second communication node, the target distance, and the target pathloss are used together for determining transmitting power of the second signal.

In one embodiment, a first sequence is used for generating the second signal; at least one of time-frequency resources occupied by the first signaling or time-frequency resources occupied by the first signal is used for determining time-frequency resources occupied by the second signal, or at least one of time-frequency resources occupied by the first signaling or time-frequency resources occupied by the first signal is used for determining the first sequence, or at least one of time-frequency resources occupied by the first signaling or time-frequency resources occupied by the first signal is used for determining time-frequency resources occupied by the second signal and the first sequence.

Embodiment 18

Figure 18:
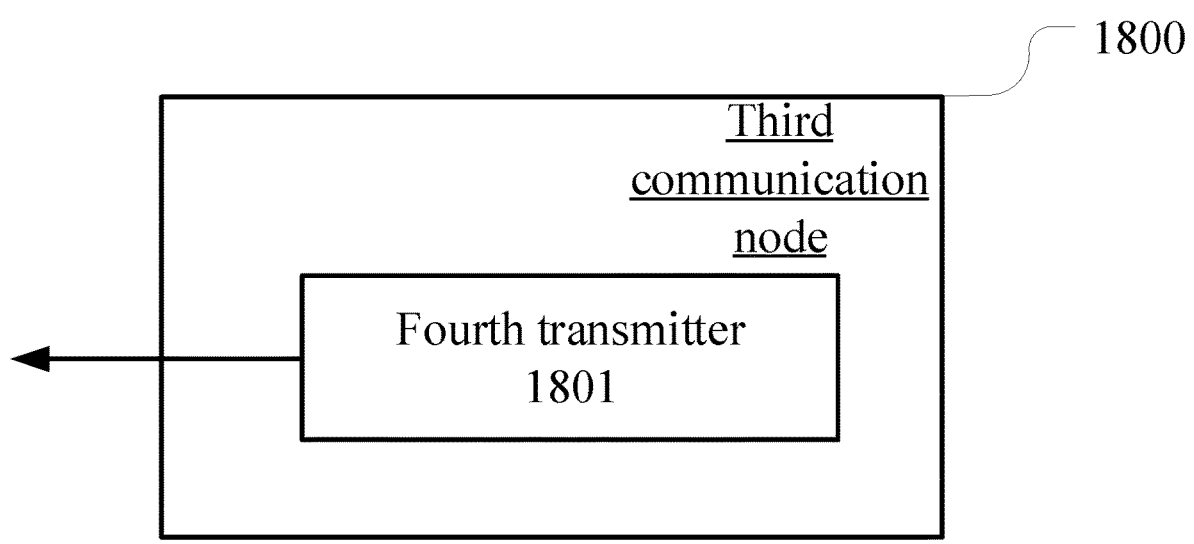
FIG. 18 illustrates a structure block diagram of a processing device in a third communication node according to one embodiment of the present disclosure.

Embodiment 18 illustrates a structure block diagram of a processing device in a third communication node according to one embodiment, as shown in FIG. 18. In FIG. 18, the third communication node processing device 1800 comprises the fourth transmitter 1801. The fourth transmitter 1801 comprises the controller/processor 540, the transmitter/receiver 516 (including the antenna 520) and the transmitting processor 515 in FIG. 5 of the present disclosure.

In Embodiment 18, the fourth transmitter 1801 transmits first information and second information; wherein the first information is used for determining first power, and the second information is used for indicating a reference candidate combination out of the X candidate combinations; the reference candidate combination is one of the X candidate combinations, and any of the X candidate combinations comprises a pathloss and a distance, the X being a positive integer greater than 1; the reference candidate combination comprises a reference pathloss and a reference distance, the reference distance being greater than 0; the reference pathloss and the reference distance are used for determining a pathloss of a Sidelink.

In one embodiment, the fourth transmitter 1801 transmits third information; wherein the third information is used for determining a target pathloss factor, a target pathloss is a pathloss for a transmission distance of a Sidelink being equal to a target distance, and a unit of the target pathloss and a unit of the reference pathloss are both dB; for a given ratio between the target distance and the reference distance, a difference value between the target pathloss and the reference pathloss is linearly related to the target pathloss factor.

In one embodiment, the second information comprises M sub-information-block(s), which is(are) respectively used for determining M pathloss(es), the M sub-information-block(s) being used for determining M zone identifications respectively, the M being a positive integer; any of the M zone identification(s) is used for identifying a geographic zone, and a geographic location of a receiver of the second information is used for determining a target zone identification, the target zone identification being one of the M zone identification(s); the reference pathloss is one of the M pathloss(es), and a sub-information-block among the M sub-information-block(s) used for determining the reference pathloss is also used for determining the target zone identification.

In one embodiment, the fourth transmitter 1801 transmits fourth information; wherein the fourth information is used for determining a second parameter, and the second parameter and the target pathloss are used for determining the second power.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The first communication node or the second communication node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The third communication node or base station or network side equipment in the present disclosure includes but is not limited to macro-cellular base stations, micro-cellular base stations, home base stations, relay base station, eNB, gNB, Transmitter Receiver Point (TRP), GNSS, relay satellites, satellite base stations, space base stations and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first communication node for wireless communications, comprising:
a first receiver, receiving first information and second information, the first information being used for determining first power, the second information being used for determining a reference pathloss;
a first transmitter, transmitting a first signaling; and
a second transmitter, transmitting a first signal;
wherein the first signaling is used for indicating a target distance and time-frequency resources occupied by the first signal; the reference pathloss corresponds to a reference distance, the reference distance being greater than 0; a ratio between the target distance and the reference distance as well as the reference pathloss are used together for determining a target pathloss; the target pathloss is used for determining second power, and a smaller value between the first power and the second power is used for determining transmitting power of the first signal.

2. The first communication node according to claim 1, wherein the first receiver receives third information; herein, the third information is used for determining a target pathloss factor, a unit of the target pathloss and a unit of the reference pathloss are both dB; for a given ratio between the target distance and the reference distance, a difference value between the target pathloss and the reference pathloss is linearly related to the target pathloss factor.

3. The first communication node according to claim 1, wherein the reference pathloss and the reference distance belong to a reference candidate combination, the reference candidate combination being one of X candidate combinations, and the second information is used for determining the reference candidate combination out of the X candidate combinations; any of the X candidate combinations comprises a pathloss and a distance, the X being a positive integer greater than 1.

4. The first communication node according to claim 1, wherein the second information comprises M sub-information-block(s), which is(are) respectively used for determining M pathloss(es), the M sub-information-block(s) being used for determining M zone identification(s) respectively, the M being a positive integer; any of the M zone identification(s) is used for identifying a geographic zone, and a geographic location of the first communication node is used for determining a target zone identification, the target zone identification being one of the M zone identification(s); the reference pathloss is one of the M pathloss(es), and a sub-information-block among the M sub-information-block(s) used for determining the reference pathloss is also used for determining the target zone identification.

5. The first communication node according to claim 1, wherein the first receiver performs a first measurement, the first measurement being used for determining a first measurement quantity; herein, the first measurement quantity is used for determining a first pathloss, the first information is used for determining a first parameter, the first pathloss together with the first parameter being used for determining the first power.

6. The first communication node according to claim 1, wherein the first receiver receives fourth information; wherein the fourth information is used for determining a second parameter, and the second parameter and the target pathloss are used for determining the second power.

7. The first communication node according to claim 1, comprising:
a second receiver, monitoring a second signal;
wherein the second signal is used for determining whether the first signal is correctly received; a first sequence is used for generating the second signal; at least one of time-frequency resources occupied by the first signaling or time-frequency resources occupied by the first signal is used for determining time-frequency resources occupied by the second signal, or at least one of the time-frequency resources occupied by the first signaling or the time-frequency resources occupied by the first signal is used for determining the first sequence, or at least one of the time-frequency resources occupied by the first signaling or the time-frequency resources occupied by the first signal is used for determining time-frequency resources occupied by the second signal and the first sequence.

8. The first communication node according to claim 1, wherein the first signal comprises a first sub-signal and a second sub-signal, and frequency-domain resources occupied by the first sub-signal are different from frequency-domain resources occupied by the second sub-signal; frequency-domain resources occupied by the second sub-signal comprise frequency-domain resources occupied by the first sub-signal, and time-domain resources occupied by the first sub-signal and time-domain resources occupied by the second sub-signal are orthogonal in time domain; a smaller value between the first power and the second power is used for determining transmitting power of the second sub-signal, and transmitting power of the second sub-signal, a bandwidth of frequency-domain resources occupied by the second sub-signal and a bandwidth of frequency-domain resources occupied by the first sub-signal are used together for determining transmitting power of the first sub-signal.

9. The first communication node according to claim 1, wherein the first information indicates M maximum transmitting power for M Chanel Busy Ratio (CBR) range(s), the M being a positive integer; a CBR for the first communication node when transmitting the first signal belongs to a first CBR range, the first CBR range being one of the M CBR range(s), and the first power is equal to one of the M maximum transmitting power corresponding to the first CBR range.

10. A method in a first communication node for wireless communications, comprising:
receiving first information and second information, the first information being used for determining first power, the second information being used for determining a reference pathloss;
transmitting a first signaling; and
transmitting a first signal;
wherein the first signaling is used for indicating a target distance and time-frequency resources occupied by the first signal; the reference pathloss corresponds to a reference distance, the reference distance being greater than 0; a ratio between the target distance and the reference distance as well as the reference pathloss are used together for determining a target pathloss; the target pathloss is used for determining second power, and a smaller value between the first power and the second power is used for determining transmitting power of the first signal.

11. The method according to claim 10, comprising:
receiving third information;
wherein, the third information is used for determining a target pathloss factor, a unit of the target pathloss and a unit of the reference pathloss are both dB; for a given ratio between the target distance and the reference distance, a difference value between the target pathloss and the reference pathloss is linearly related to the target pathloss factor.

12. The method according to claim 10, wherein the reference pathloss and the reference distance belong to a reference candidate combination, the reference candidate combination being one of X candidate combinations, and the second information is used for determining the reference candidate combination out of the X candidate combinations; any of the X candidate combinations comprises a pathloss and a distance, the X being a positive integer greater than 1.

13. The method according to claim 10, wherein the second information comprises M sub-information-block(s), which is(are) respectively used for determining M pathloss(es), the M sub-information-block(s) being used for determining M zone identification(s) respectively, the M being a positive integer; any of the M zone identification(s) is used for identifying a geographic zone, and a geographic location of the first communication node is used for determining a target zone identification, the target zone identification being one of the M zone identification(s); the reference pathloss is one of the M pathloss(es), and a sub-information-block among the M sub-information-block(s) used for determining the reference pathloss is also used for determining the target zone identification.

14. The method according to claim 10, comprising:
performing a first measurement, the first measurement being used for determining a first measurement quantity;
wherein, the first measurement quantity is used for determining a first pathloss, the first information is used for determining a first parameter, the first pathloss together with the first parameter being used for determining the first power.

15. The method according to claim 10, comprising:
receiving fourth information;
wherein the fourth information is used for determining a second parameter, and the second parameter and the target pathloss are used for determining the second power.

16. The method according to claim 10, comprising:
monitoring a second signal;
wherein the second signal is used for determining whether the first signal is correctly received; a first sequence is used for generating the second signal; at least one of time-frequency resources occupied by the first signaling or time-frequency resources occupied by the first signal is used for determining time-frequency resources occupied by the second signal, or at least one of the time-frequency resources occupied by the first signaling or the time-frequency resources occupied by the first signal is used for determining the first sequence, or at least one of the time-frequency resources occupied by the first signaling or the time-frequency resources occupied by the first signal is used for determining time-frequency resources occupied by the second signal and the first sequence.

17. The method according to claim 10, wherein the first signal comprises a first sub-signal and a second sub-signal, and frequency-domain resources occupied by the first sub-signal are different from frequency-domain resources occupied by the second sub-signal; frequency-domain resources occupied by the second sub-signal comprise frequency-domain resources occupied by the first sub-signal, and time-domain resources occupied by the first sub-signal and time-domain resources occupied by the second sub-signal are orthogonal in time domain; a smaller value between the first power and the second power is used for determining transmitting power of the second sub-signal, and transmitting power of the second sub-signal, a bandwidth of frequency-domain resources occupied by the second sub-signal and a bandwidth of frequency-domain resources occupied by the first sub-signal are used together for determining transmitting power of the first sub-signal.

18. The method according to claim 10, wherein the first information indicates M maximum transmitting power for M Chanel Busy Ratio (CBR) range(s), the M being a positive integer; a CBR for the first communication node when transmitting the first signal belongs to a first CBR range, the first CBR range being one of the M CBR range(s), and the first power is equal to one of the M maximum transmitting power corresponding to the first CBR range.

* * * * *